United States Patent [19]

Slocum

[11] Patent Number: 4,676,002

[45] Date of Patent: Jun. 30, 1987

[54] MECHANISMS TO DETERMINE POSITION AND ORIENTATION IN SPACE

[76] Inventor: Alexander H. Slocum, P.O. Box 268, 1290 Balls Hill Rd., McLean, Va. 22101

[21] Appl. No.: 811,737

[22] Filed: Dec. 20, 1985

Related U.S. Application Data

[63] Continuation-in-part of Ser. No. 624,256, Jun. 25, 1984, Pat. No. 4,606,696.

[51] Int. Cl.[4] .......................... G01B 7/00; G01B 7/03
[52] U.S. Cl. .................................. 33/1 MP; 33/1 N; 33/1 PT; 33/626; 33/503; 901/9
[58] Field of Search .............. 33/1 MP, 1 N, 1 PT, 33/1 M, 503, 504, 185 R; 901/45, 9

[56] References Cited

U.S. PATENT DOCUMENTS

| | | | |
|---|---|---|---|
| 4,240,205 | 12/1980 | Tuss | 33/1 MP |
| 4,283,153 | 8/1981 | Brendamour | 33/185 R |
| 4,316,329 | 2/1982 | Watson | 33/185 R |
| 4,485,562 | 12/1984 | DeFazio | 33/185 R |
| 4,505,049 | 3/1985 | Kuno et al. | 33/1 PT |
| 4,517,744 | 5/1985 | Consales et al. | 33/185 R |
| 4,543,724 | 10/1985 | Shiba et al. | 33/1 N |
| 4,573,271 | 3/1986 | Hamilton et al. | 33/185 R |

Primary Examiner—Willis Little
Attorney, Agent, or Firm—Robert Shaw

[57] ABSTRACT

A system to move an object in space. The system includes a structural mechanism having interconnected structural beams for applying translational forces and movements to position an object held by the structural mechanism. The system has a measuring mechanism to determine, with precision, the actual position and orientation of each structural beam with respect to its attached neighboring structural beam. The structural mechanism includes at least one structural beam and an associated measuring beam. The measuring beam is in contact only with its associated structural beam, the contact being effected through support devices that provide the only physical contact between the structural beam and the associated measuring beam.

41 Claims, 20 Drawing Figures

MECHANISMS TO DETERMINE POSITION AND ORIENTATION IN SPACE

This is a continuation-in-part of an application for Letters Patent Ser. No. 624,256, filed June 25, 1984, now U.S. Pat. No. 4,606,696.

The present invention relates to mechanisms to determine position and orientation in space. The invention herein disclosed addresses the problem of sensing and compensating for position errors in articulated structures. In particular, large robotic manipulators (on the order of 36-inches reach and 20 pound payload) can only be used to repeat previously taught positions to within 0.010" (somewhat better performance can be achieved after an extensive warm up period). Thus, since accuracy is presently unobtainable, robots are used mainly in dedicated systems where special fixtures have been designed to allow the robot to manipulate a particular part or perform a specific function based on previously taught moves. Accuracy, as opposed to repeatability, is the ability to achieve remote control of the motion of a tool along a desired path, or to position the tool at any desired point in the work envelope. Accurate robots are needed for laser and water jet machining, hole drilling, and some insertion tasks. Note that accuracies on the order of 0.001" in 50" (one part in 50,000) are required for these tasks. Robots are inaccurate because they have no sensors to detect errors caused by, for example, gear backlash or structural deflections. Several patents related to the problem of increasing robot performance have been issued.

U.S. Pat. No. 4,362,977 (Evans et al) describes a "manually manipulated teaching robot" whose motions a large robot are to later follow, but the method address the problem of repeatability not accuracy. It is also doubtful, from an engineering standpoint, if the method will really work.

U.S. Pat. No. 4,419,041 (Rose) for "Spatial Mechanism and Method" uses a system of gears and racks to record the three Eulerian angles that a single arm can trace out in space (including twist of the arm about its length) and the extension of the arm via a telescoping tube. Accuracy on the order of one part in 7,000 is claimed which is an order of magnitude less than required for large robotic applications. The method is also is not applicable to multi-link structures.

U.S. Pat. No. 4,119,212 (Flemming) for "Monitoring the Location of a Robot Hand" merely describes a "knee" joint with a planar goniometer attached (such devices have been used in the biomedical field for years). As disclosed, the system is not structurally stable because a large static error in the measuring system would occur when the linkage is straightened out and gravity applied normal to its length and the axis of joint rotation. Since the two links are connected via an angular measuring device (which is only supported by the links) and supported at their ends by angular measuring devices, no bending moments can be transferred about the joint axis. Since no length adjustment is allowed for, the links will sag until static equilibrium is reached. Also no out-of-plane bending is measured.

These patents are typical of the work of designers who have applied their intuition in an attempt to design accurate articulated structures. Many mechanisms, which look good on paper, have been designed, but they all fail in practice because they rely on the accuracy of mechanical components. As will be shown below, high accuracy in articulated structures cannot be achieved if one relies on the mechanical accuracy of any component. In fact, the basic physics of the situation is that most structural components can at best be machined to 0.0001", which when multiplied by an arm length of 50" and three joints, leaves an error on the order of 0.015". In summary, when mechanical accuracy is relied upon, accuracies at a joint on the order of 0.0001" can be obtained; however, when non-contact electronic sensing methods are used, accuracies of 0.000001" (100 times the accuracy of a mechanical system) can be obtained. Thus none of the above patents, which rely on the mechanical accuracy of components, can ever hope to accurately measure the endpoint of a large articulated structure.

It is also apparent that some robot designers have been trying to increase structural stiffness (in order to decrease structural deflections) in an effort to increase accuracy (as is done with machine tools). But robots are cantilevered articulated structures with respect to which loads and joint errors are amplified by arm lengths. In contrast, machine tools are sliding massive structures wherein load is not a strong function of position; thus accuracy in machine tools is attained by building a massive structure with the predominant deformations due to shear and axial loads. Adding more metal to robots, in an attempt to increase stiffness, can reduce deformations due to applied loads, but such action creates a slow reach limited tool (on the order of a machine tool) and not a fast dexterous robot. Thus if a robot is to be accurate, it will require a sensor system, which can measure all the motions of the structural system, to feedback signals to a controlling servo-actuator system.

The present invention provides a sensor system that can determine the true position and orientation of a structure's (especially structures of the articulated type) joints and endpoint. The sensor system's accuracy is limited only by the resolution of the sensors and does not restrict the movements of the structure. Thus the burden of accuracy is placed upon the silicon of the sensors (which does not wear out) instead of the cast iron of the robot.

If one analyzes the problem of endpoint determination in depth, as the present inventor has done, and looks at a robot in its deflected shape, it will be seen that in order to determine the true position of an articulated structure what is needed is a straight line from joint to joint in each link and a method to measure the angles between the lines at the various joints. Also it must be possible to sense changes in the effective length of the straight line (i.e., changes in the distances between joints) as the robot linkage is stressed.

Attention is called by way of background to an application for Letters Patent Ser. No. 624,256, filed June 29, 1984, now U.S. Pat. No. 4,606,696, of the present inventor. In the application the disclosed preferred embodiments show structural beams with a measuring beam associated with each structural beam, the measuring beam being supported at each end by the joint at the respective end. Measurements are made between the joints and the measuring beams by optical encoders and small distance linear measuring devices. The accuracy of this system, however, is limited by that of the mechanical connection between measuring beams and encoders. The measuring beam system herein disclosed requires that each measuring beam be supported only by its associated structural beam by low reaction torque and force supports; the adjacent ends of measuring beams in the present system do not touch but are in close proximity to one another and their positional relationship is measured by sensors across the gap between them.

Accordingly, it is an objective of the present invention to provide an absolute position and orientation sensing system for articulated structures (robots for example) that can measure all three dimensional motions of the structure.

Another objective is to provide a sensing system for articulated structures that does not depend upon mechanical precision for accuracy, one in which accuracy is limited only by that of the sensors and the electronics.

Another objective is to provide an articulated structure sensing system that does not restrict the movements of the structure.

These and still further objectives are addressed hereinafter.

The foregoing objectives are attained, generally, in a system to move an object in space and to determine position and orientation of the object, that includes: a structural mechanism having interconnected structural beams (or members) for applying forces and moments to position an object held by the structural mechanism. Measuring means is provided to determine the actual position and orientation of eacg structural beam with respect to each attached (neighboring) structural beam. Each structural beam has an associated measuring beam which serves as part of the measuring means. One or more anchoring devices provide interconnection between a measuring beam and its associated structural member and provide the only physical contact between the structural beam and the associated measuring beam and, indeed, the only physical support between the measuring beam and the remainder of the system. Typically, the system is a robot with a plurality of articulating links, each link includes a structural beam and an associated measuring beam, typically with an anchoring device at each end of the measuring beam to connect that measuring beam to the structural beam in a way that deflection of the associated structural beam does not impose any load on the measuring beam. The ends of adjacent measuring beams are in close proximity to one another with a small gap therebetween. Sensors supply position information between measuring beams across the gap.

The key to accuracy is to make measurements at the structural joints with sensors which measure across air gaps. Clusters of sensors at the joints, however, must be connected by rigid, non-load bearing, non-deforming, measuring beams, as opposed to being connected by the continually deforming structural beams. Thus an accurate "stick" model representation is obtained. With the lengths of the sticks fixed, and the angles between the sticks determined by the non-contact sensor clusters at the joints, end point to end point measurements with accuracies 100 times greater than any mechanical system can be obtained.

The invention is hereinafter described with reference to the accompanying drawing in which.

Figure 2:
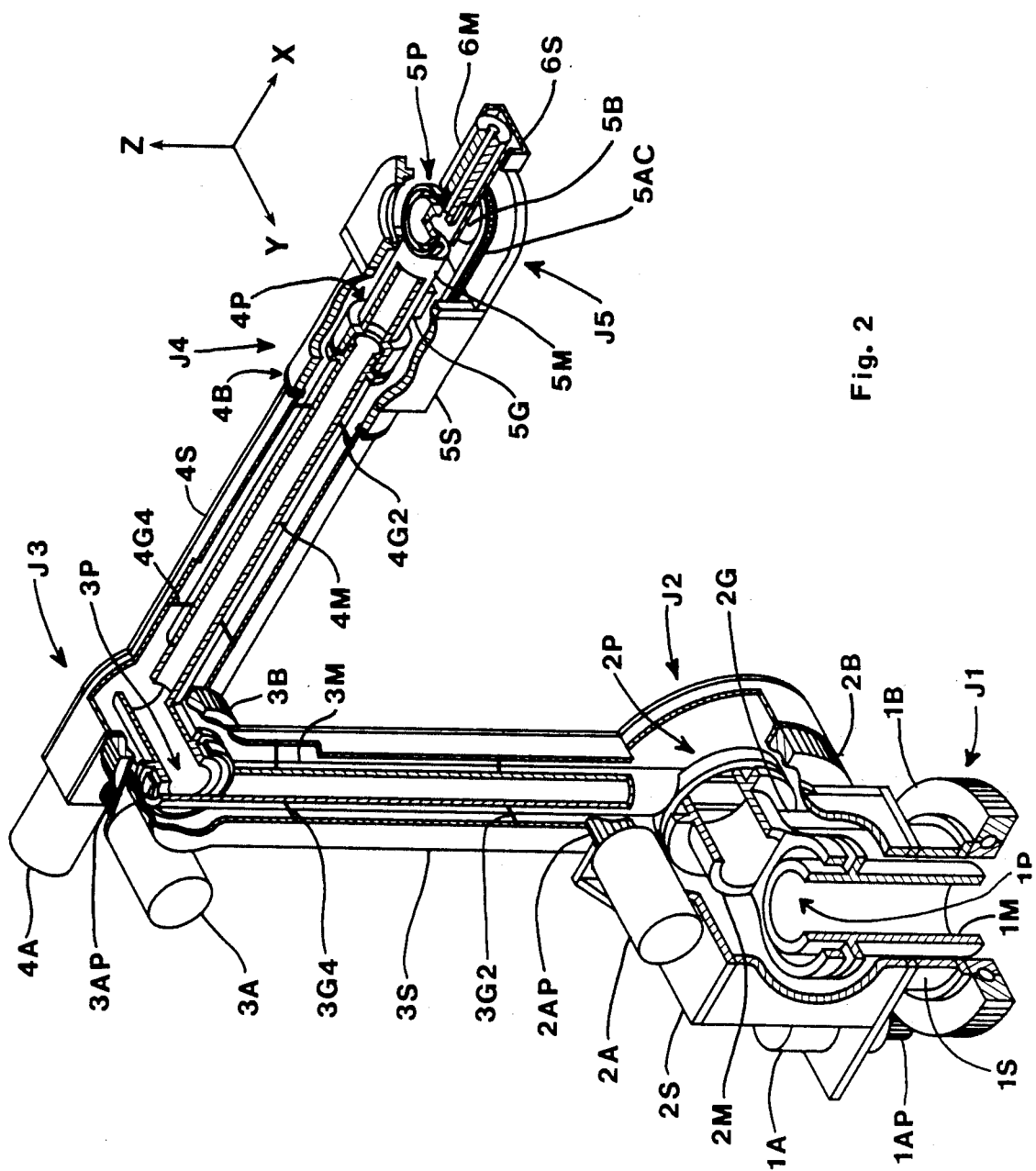
FIG. 2 is a cutaway schematic isometric view of a five degree of freedom robot, that shows the outer structural members and drive motors with the measuring beam system suspended inside the structural system by wire supports.
Figure 7:
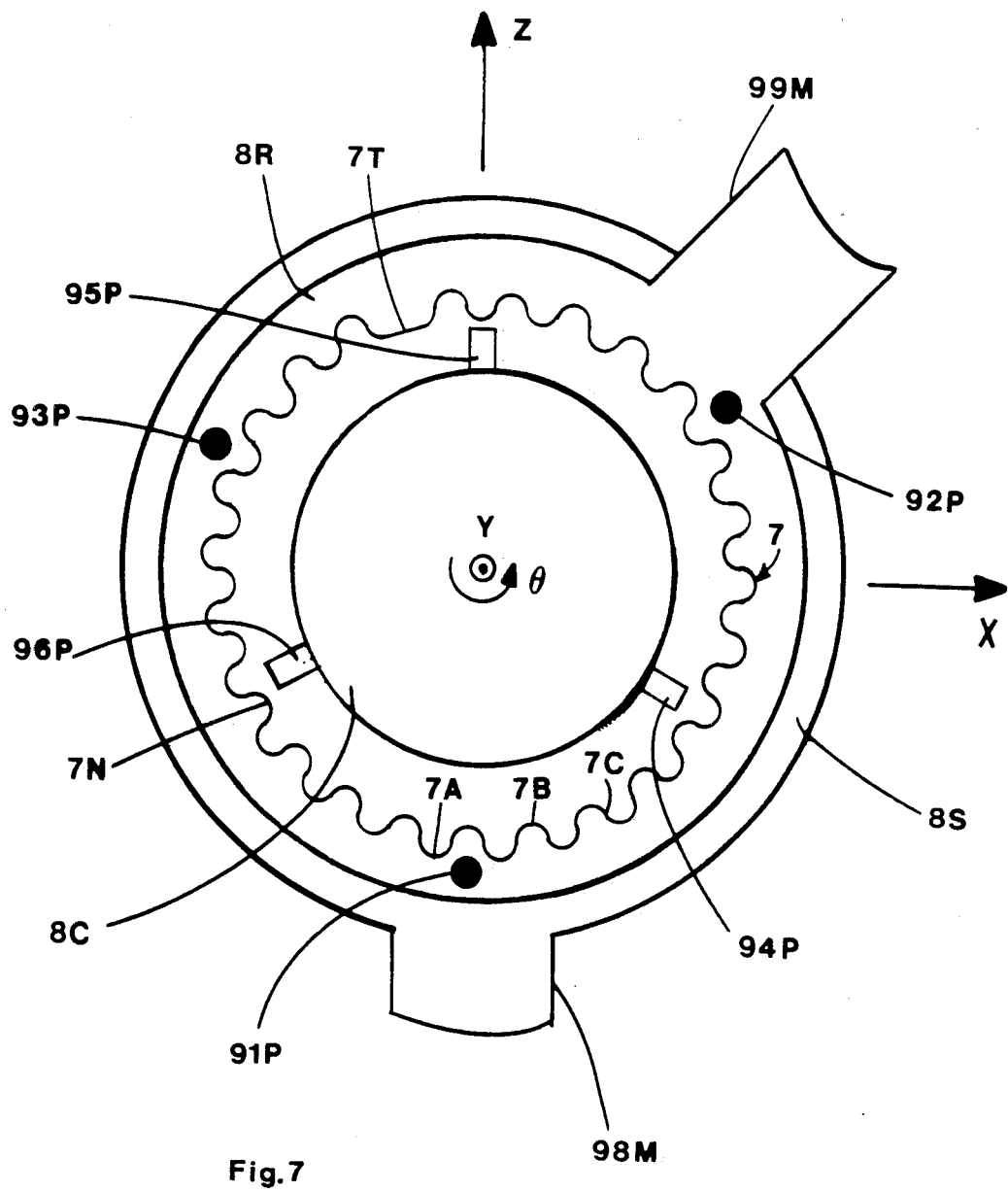
Figure 8:
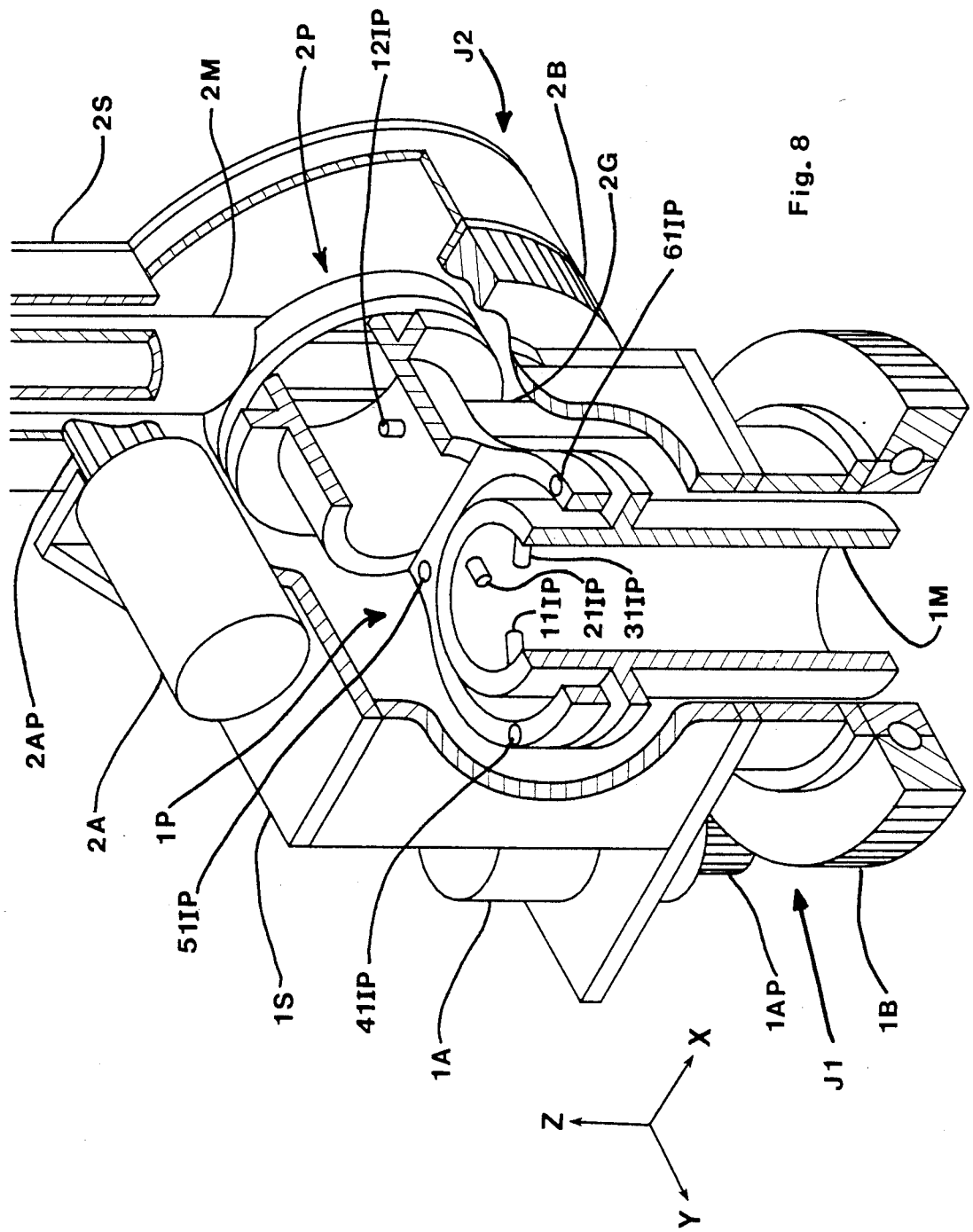
Figure 9:
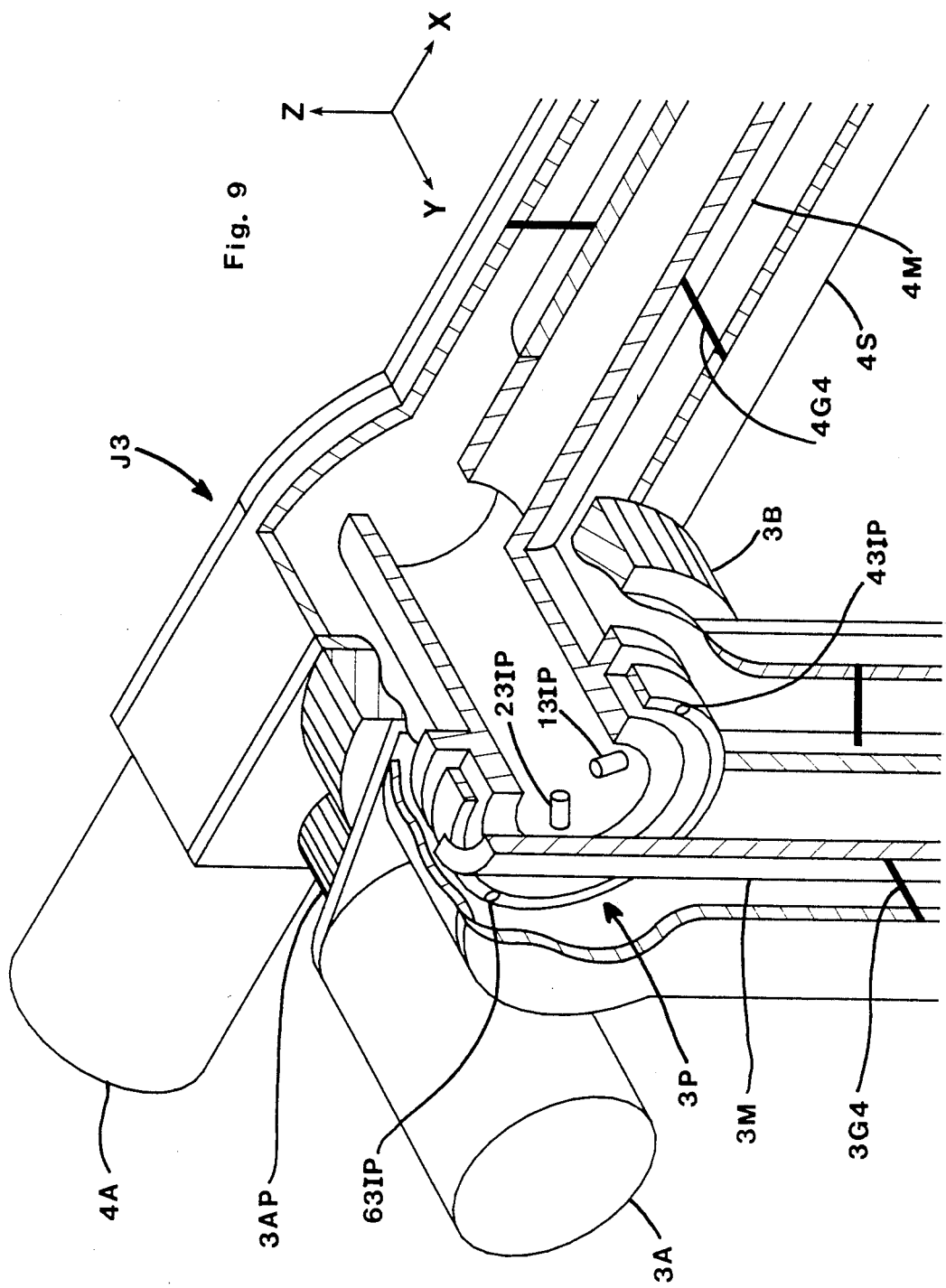
Figure 10:
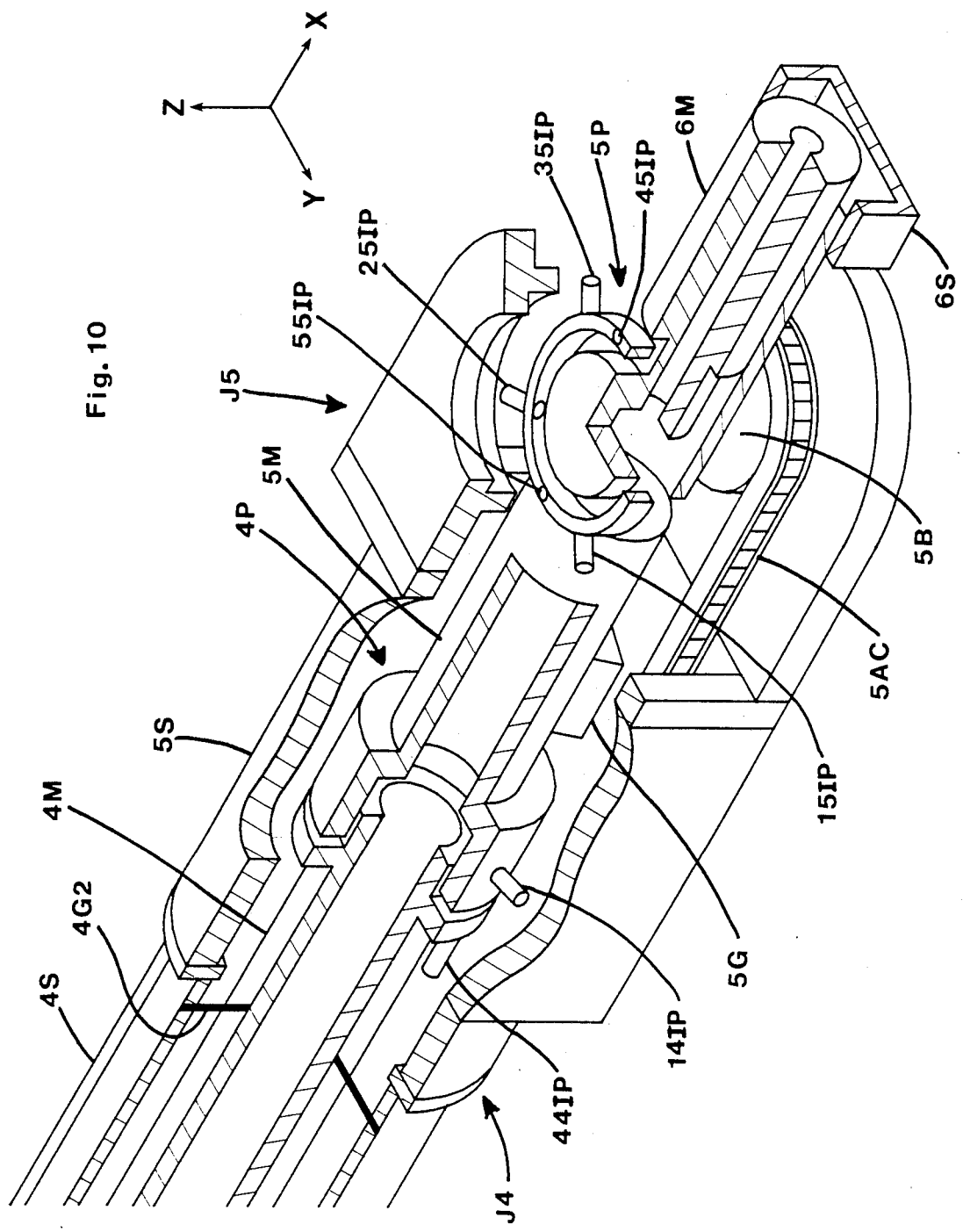
Figure 11:
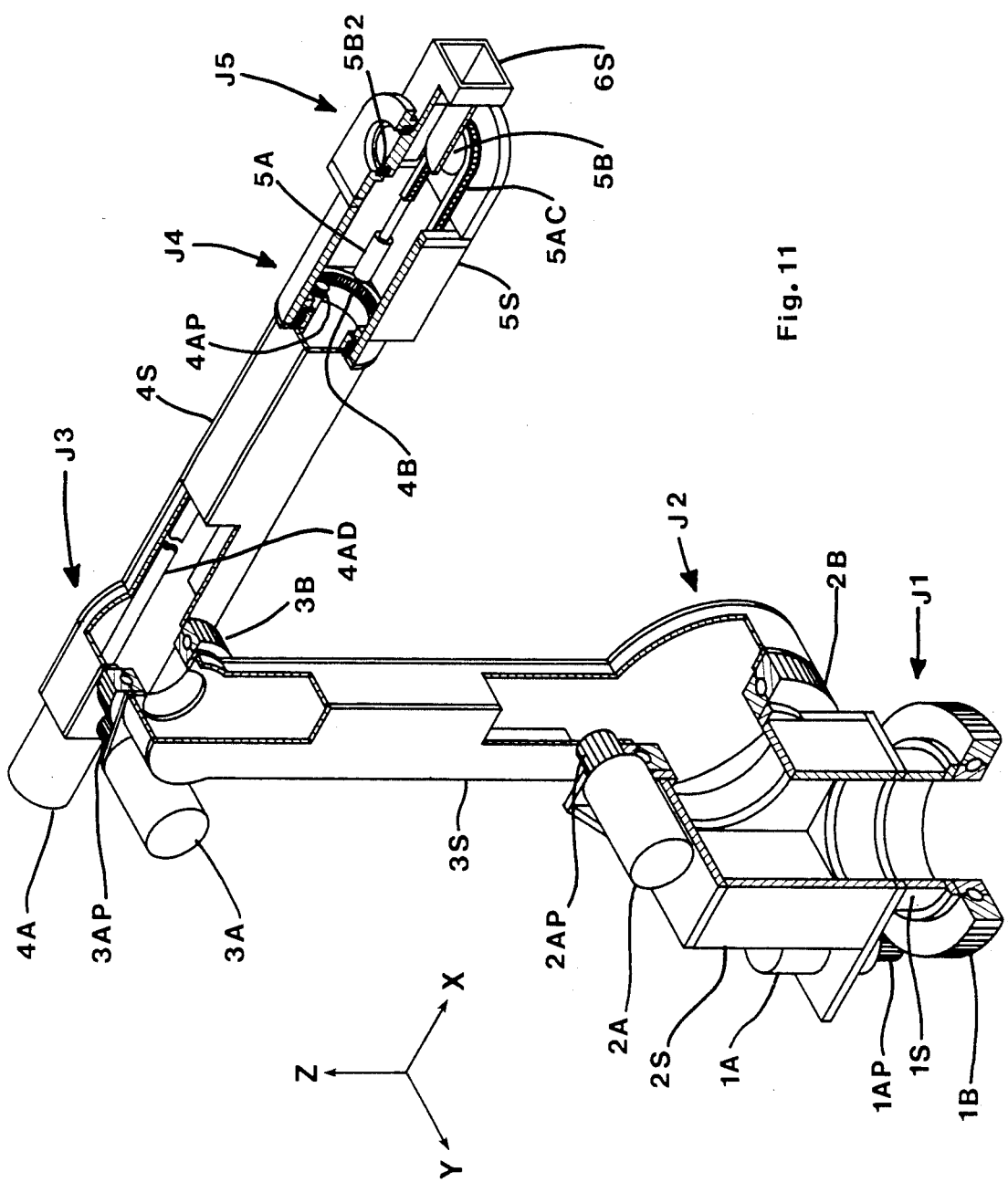
Figure 12:
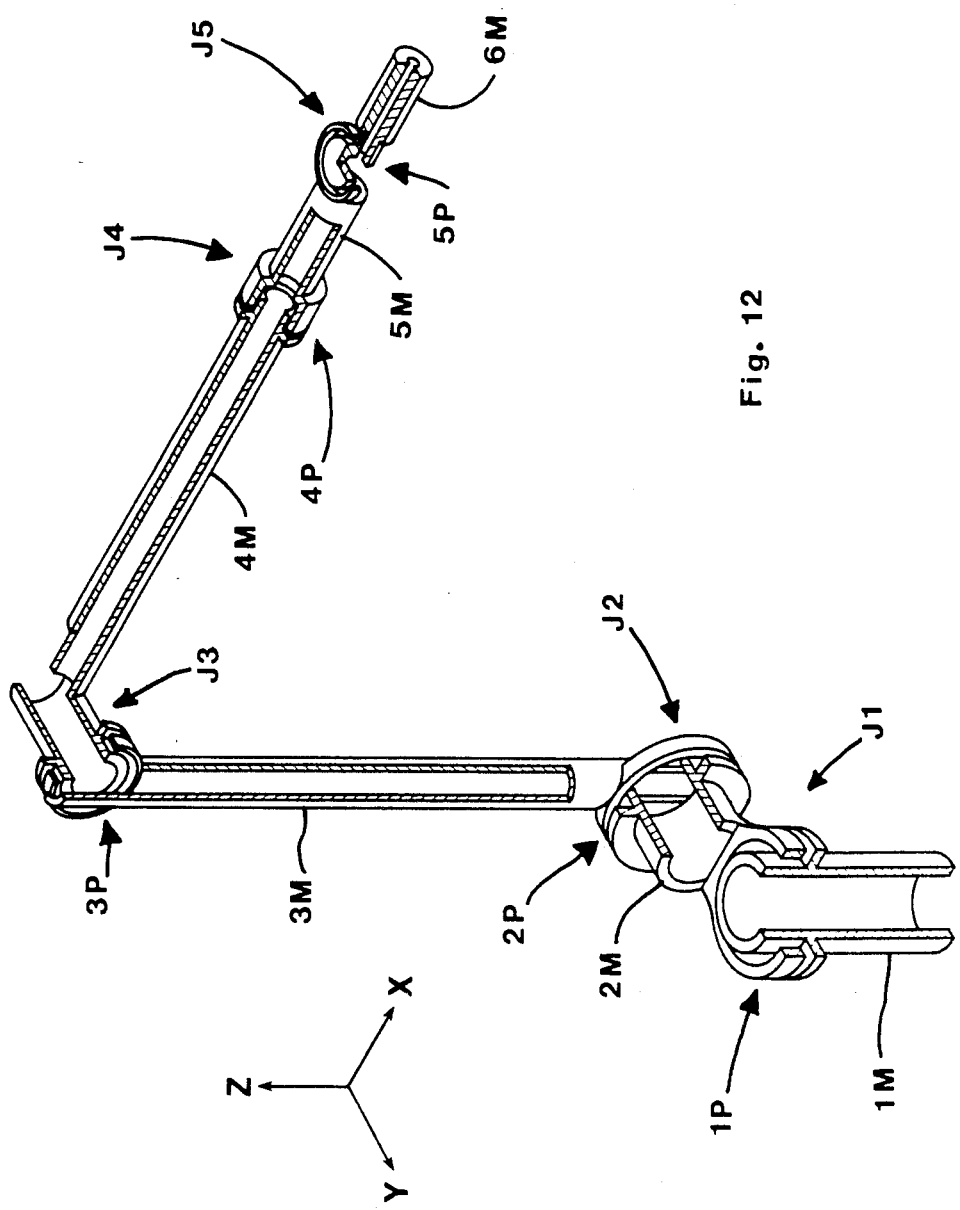
Figure 13:
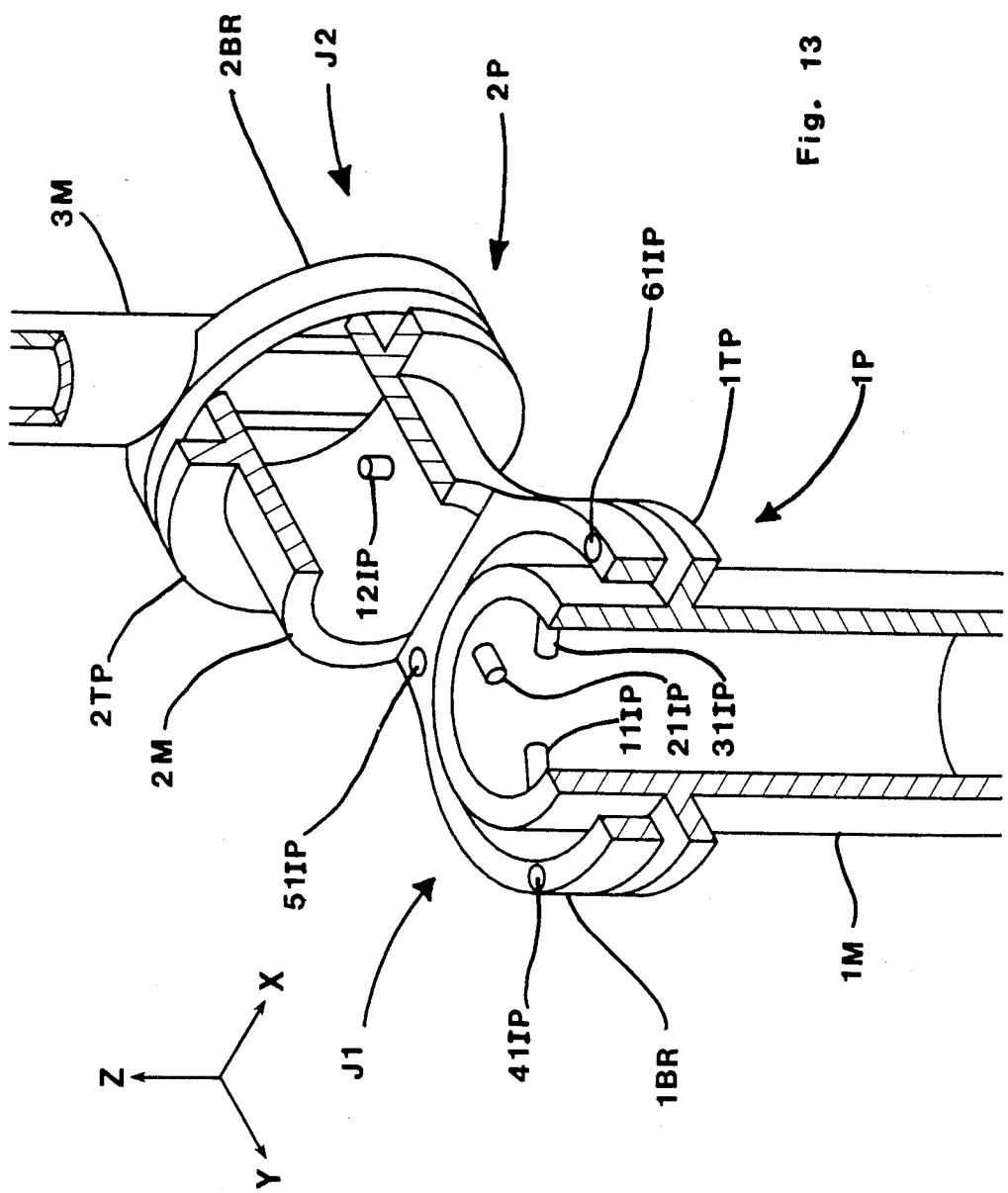
Figure 14:
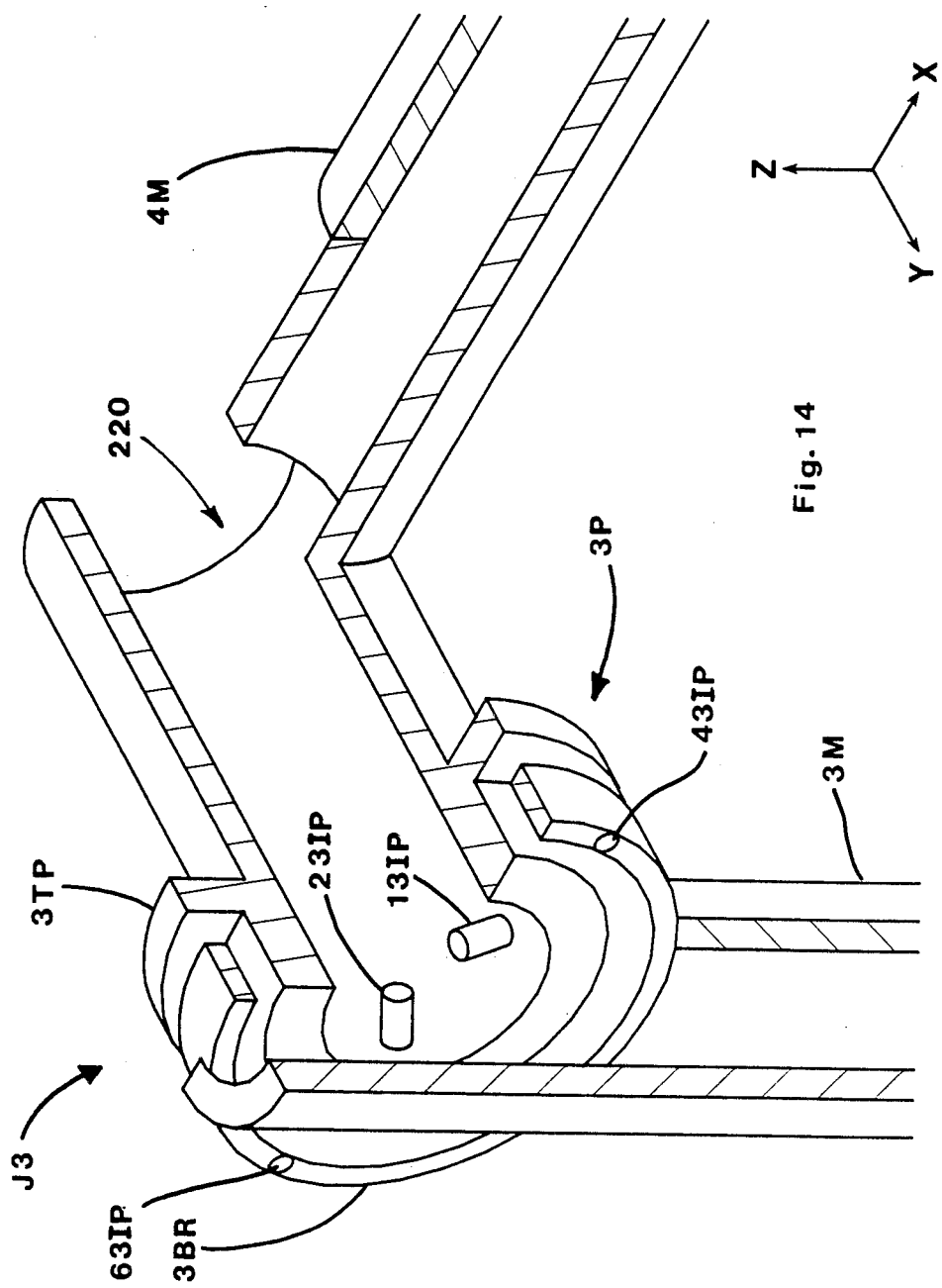
Figure 15:
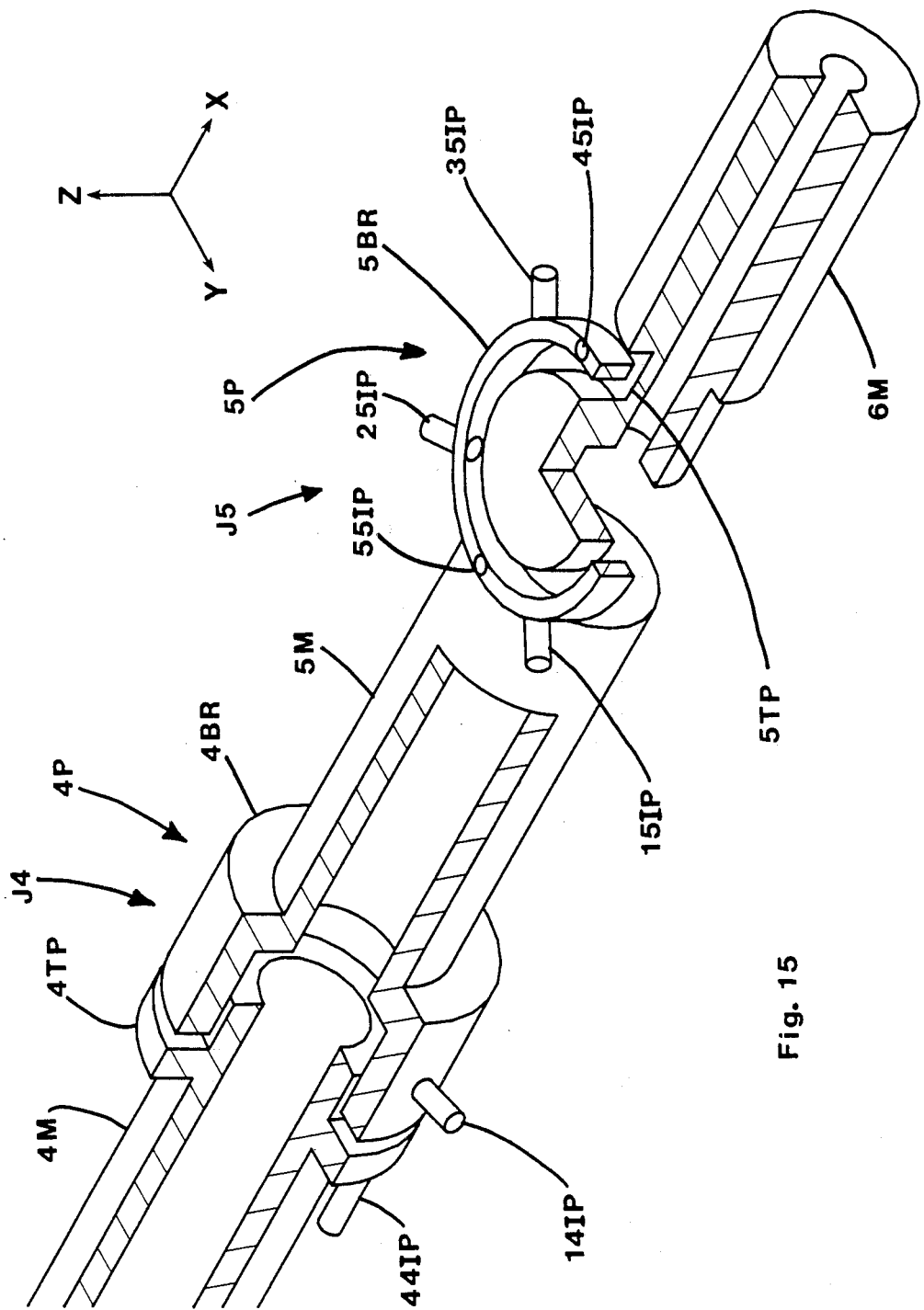
Figure 16:
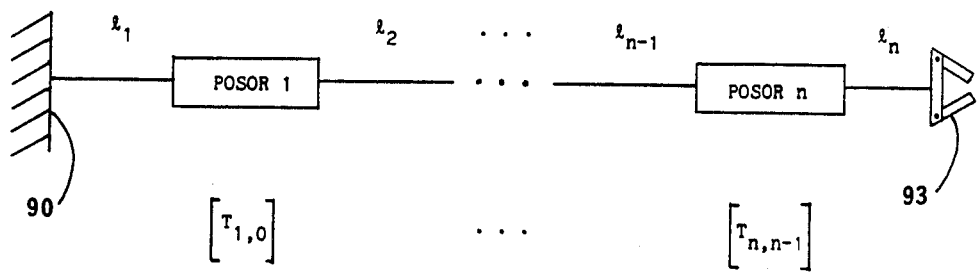
Figure 17:
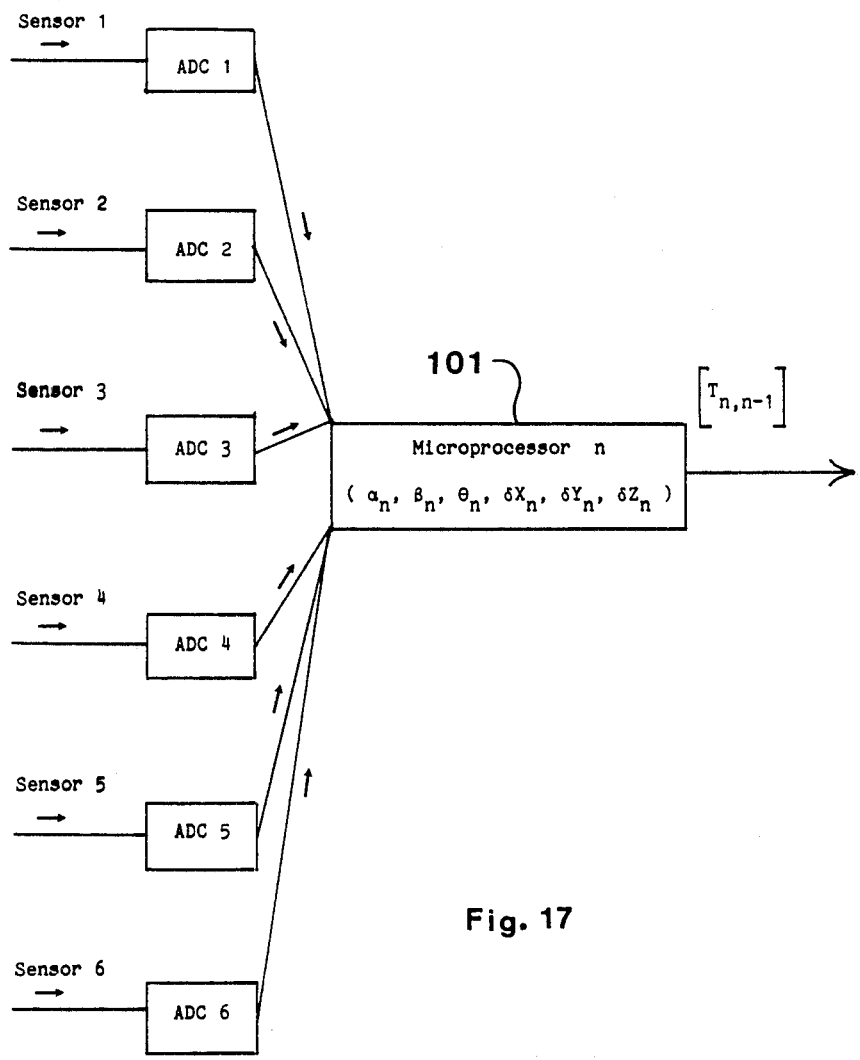
Figure 18:
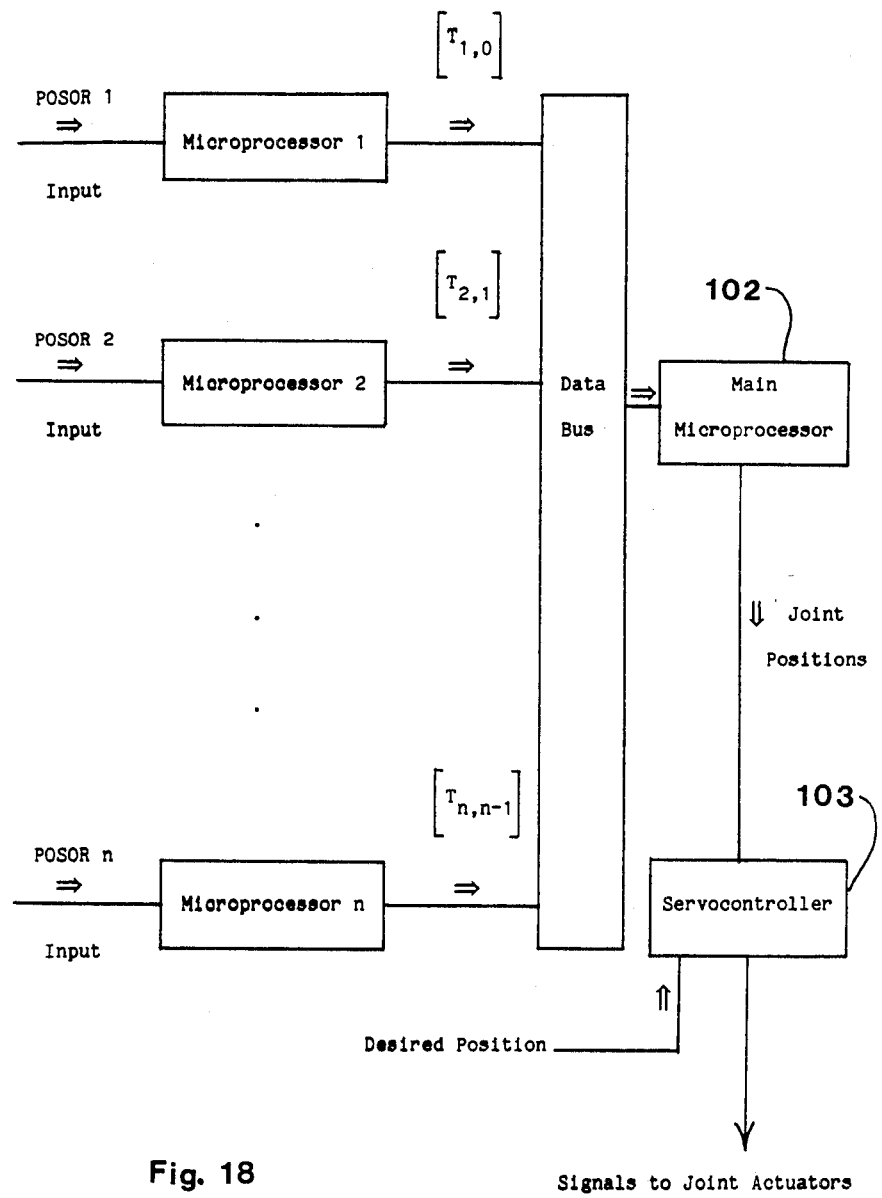
Figure 19:
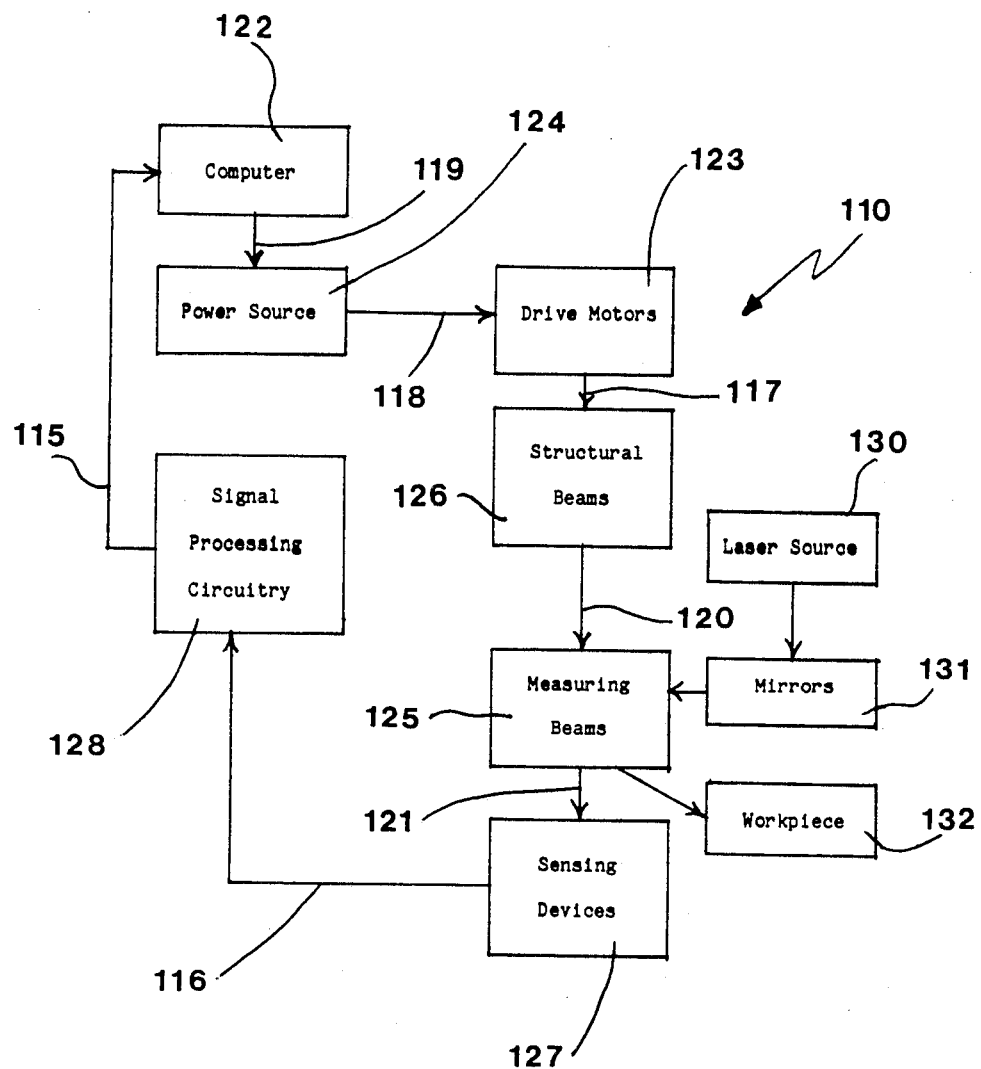
Figure 20:
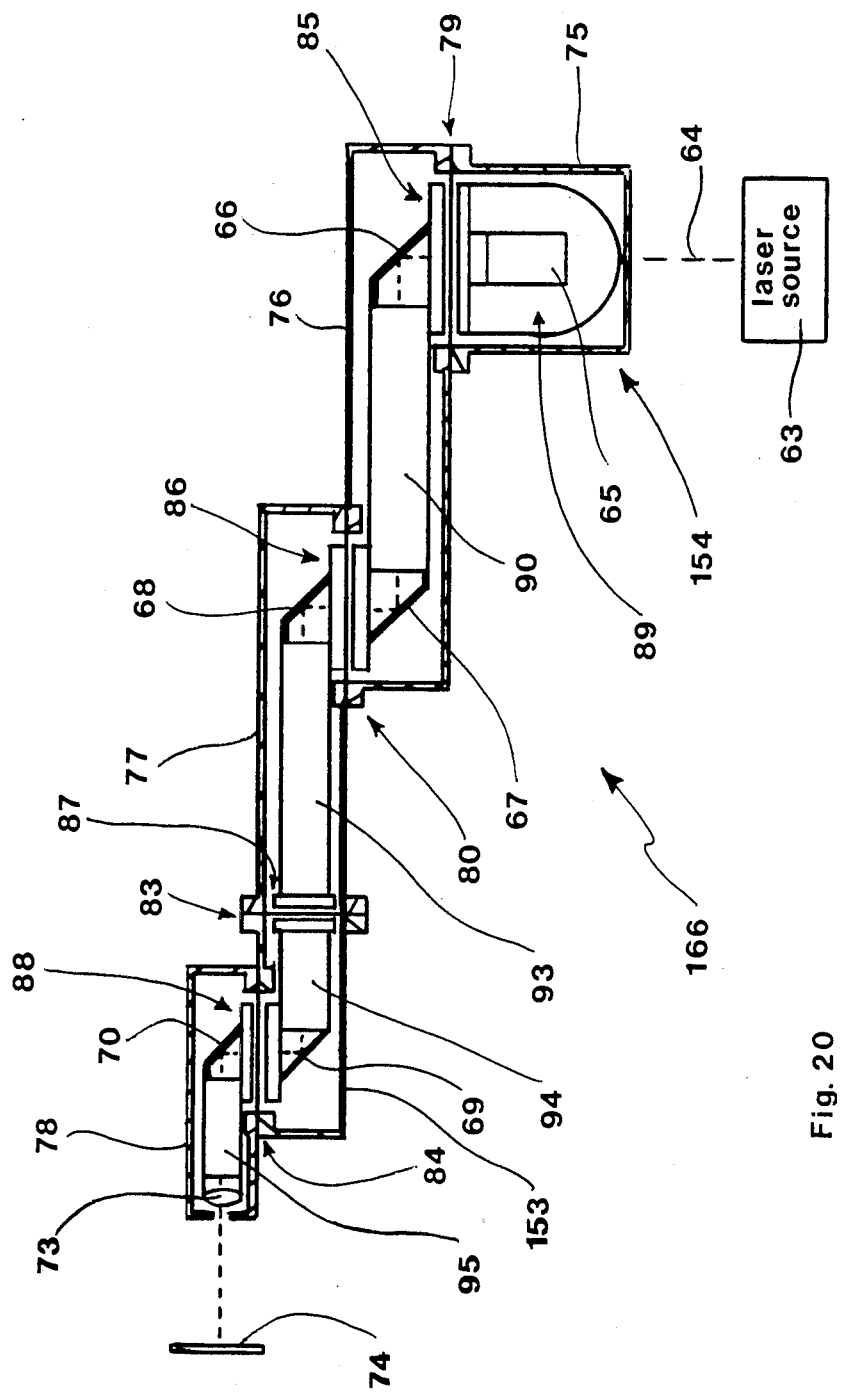

FIG. 7 is a schematic view of a "Bumpy Ring Sensor" which includes an inner ring containing three distance measuring sensors and an outer ring containing a "Bumpy" surface, the output of the three sensors being three out of phase waveforms whose relative amplitude is proportional to the XZ position of the rings and whose relative phase is proportional to the $\theta$ orientation of the rings in an XYZ coordinate system;

FIG. 8 is a cutaway schematic isometric enlarged view of the "shoulder and waist" of the robot shown in FIG. 2;

FIG. 9 is a cutaway schematic isometric enlarged view of the "elbow" of the robot shown in FIG. 2;

FIG. 10 is a cutaway schematic enlarged isometric view of the wrist of the robot shown in FIG. 2;

FIG. 11 is a cutaway schematic isometric view of the structural system of the robot shown in FIG. 2;

FIG. 12 is a cutaway schematic isometric view of the measuring beam system of the robot shown in FIG. 2 (supports are not shown);

FIG. 13 is a cutaway schematic isometric view of the "shoulder and waist" of the measuring beam system shown in FIG. 12 and FIG. 2;

FIG. 14 is a cutaway schematic isometric view of the "elbow" of the measuring beam system shown in FIG. 12 and FIG. 2;

FIG. 15 is a cutaway schematic isometric view of the "wrist" of the measuring beam system shown in FIG. 12 and FIG. 2;

FIG. 16 is a schematic diagram of the measuring beams and POSORs and the position information which they supply to enable the calculation of the joint coordinate frame transformation matrices;

FIG. 17 is a schematic of the six analog-to-digital converts (known in the trade as ADCs) which convert the electrical output of the distance measuring sensors on each POSOR into digital form, the digitized output from each POSOR being processed by a microprocessor assigned to each POSOR;

FIG. 18 is a schematic diagram of the computer architecture used to process the data from n POSORs in a structure;

FIG. 19 is a schematic of the robot components used in the implementation of the POSOR based system on an industrial robot; and FIG. 20 which shows a cutaway representative view of how a laser is beamed along the path of the measuring beams with the use of mirrors to direct the beam to do useful work.

Using the above figures as illustrative guides, the inventor's solution to the problem of robot accuracy will be discussed in detail below.

Figure 1:
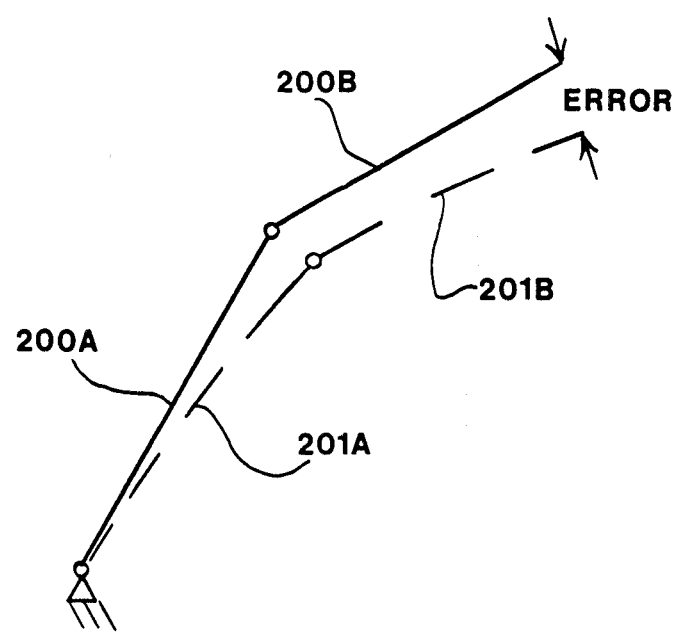
FIG. 1 is a schematic representation which shows the configuration of a two-link structure as assumed by a control computer and the actual configuration.

A schematic representation of the accuracy problem is shown in FIG. 1, where solid lines 200A and 200B represent ideal links of a robot and broken lines 201A and 201B represent actual links under load. Without a specific way for actually measuring the position of the endpoint, an error will always exist between the ideal and the actual positions of the structure. Attention is called to the example given previously which showed that the basic physics of the situation precludes relying on mechanical accuracy of the structure if one is to determine accurately the endpoint position of an articulated structure.

In order to determined the position and orientation of the endpoint of an articulated structure, one can use an internal or external measuring system. Examples of the latter include acoustic pingers and the like, but their accuracy is limited to one part in 4000 (higher accuracies can be obtained, but the system becomes so sensitive to temperature, humidity, and barometric pressure that it is not practical for use in a factory environment). Possible examples of the former were cited above in relevant patents, but they did not present any viable solutions (all relied on mechanical system accuracy).

The inventor's novel solution to the problem, as later discussed, is shown in FIG. 2 which shows a structural system of interconnected structural members (e.g., structural beams 1S, 2S, 3S, 4S, 5S, and 6S) of a robot with an inner measuring beam system (e.g. measuring beams 1M, 2M, 3M, 4M, 5M, and 6M), each measuring beam 1M, 2M, 3M, 4M, 5M, and 6M being located with its longitudinal axis essentially parallel to the longitudinal axis of the associated structural beam 1S, 2S, 3S, 4S, 5S, and 6S, respectively, and being subject to loads due only to its own mass being accelerated. The inner measuring system is suspended inside the structural system by supports which allow the measuring beams to track the structural beams without undergoing any deformations. At each joint are non-contact sensors whose outputs allow a computer to determine the relative position of the ends of adjacent (or neighboring) measuring beams. The adjacent ends of the measuring beams never touch, and the sensors always measure across air gaps. Thus once the system is calibrated, there is no physical way possible that mechanical errors can be introduced into the measurements. The accuracy of the system becomes completely dependent upon the electronics of the system. Note that electronic components, as opposed to mechanical components, do not wear with use.

As noted above, when mechanical accuracy is relied upon, local accuracies at a joint on the order of 0.0001" can be obtained; however, when non-contact electronic sensing methods are used, accuracies of 0.000001" (100 times the accuracy of a mechanical system) can be obtained. As found by the inventor, the types of measurements needed, methods of performing them, and the measuring beam system necessary to support the sensors are described in detail below.

When performing accurate measurements, the first thing to realize is that one must never assume anything. All assumptions must be carefully checked using mathematical analysis. The second thing is that a large motion will have five small motions also associated with it. This is due to the fact that no system is perfect and that it takes six unique coordinates to describe the position and orientation of a rigid body in space (a basic principle of the discipline of dynamics). Hence when a measuring beam is used to measure the motion of a structural beam, the measuring beam must measure the one large degree of freedom of the structural beam plus the accompanying five small degrees of freedom. The first impulse of designers has been to ignore these small degrees of freedom by relying on accuracy of mechanical components (e.g., bearings), but one must remember the example given above that showed how the error associated with the best mechanical components, when amplified by the reach of the robot, can create unacceptably large errors in the endpoint position.

The large degree of freedom is the motion at a joint that is controlled by the actuator at the joint. The other five degrees of freedom are due to the deformation of the structural beam caused by external loads and errors in the motion of the bearings. All these motions are small and can be described in terms of the motions that two measuring beams adjacent ends may make with respect to each other. The three small translational degrees of freedom are caused by bearing runout and by the support gimbal for the measuring beam not being exactly in line with the large degree of freedom axis of rotation as the structural beam bends.

The first small angular degree of freedom is caused by the measuring beam swinging from side to side as it tracks small sideways deflections of the structural beam. The second small angular degree of freedom is caused by twist of the structural beam about its longitudinal axis. Both of these small angular degrees of freedom can also have small components of motion caused by errors in bearing motion.

With the fact established that six degrees of freedom must be measured in order to determine the position and orientation of a structural link, one must consider how to accomplish this task without relying on mechanical accuracy (only non-contact sensing measurement methods are allowed). The methods for accomplishing this are limited by the ways in which non-contact position and orientation measurements can be made. Examples of the types of sensors which could be used include: capacitance and impedance probes, and fiber optic levers. Also lateral effect diodes can be used to measure X-Y coordinates of the center of intensity of a beam of light. Methods for combining these sensors are discussed below.

There are three basic motions which sensor groups at adjacent measuring beams will be required to make with respect to each other in order to track a structural beam: twisting, bending, and translating. For an articulated structure, these motions include: three small translational, two small rotational, and one large rotational degree of freedom. The nature of these motions lends them to be detected by looking at the relative motion between two adjacent (essentially parallel) plates. In order to determine the best method for detecting relative motion between the plates, consider that the tools available are distance sensors and lateral position sensors. Also, if desired, local geometry variations (bumps) can be introduced. Detailed concepts are discussed below.

Figure 5:
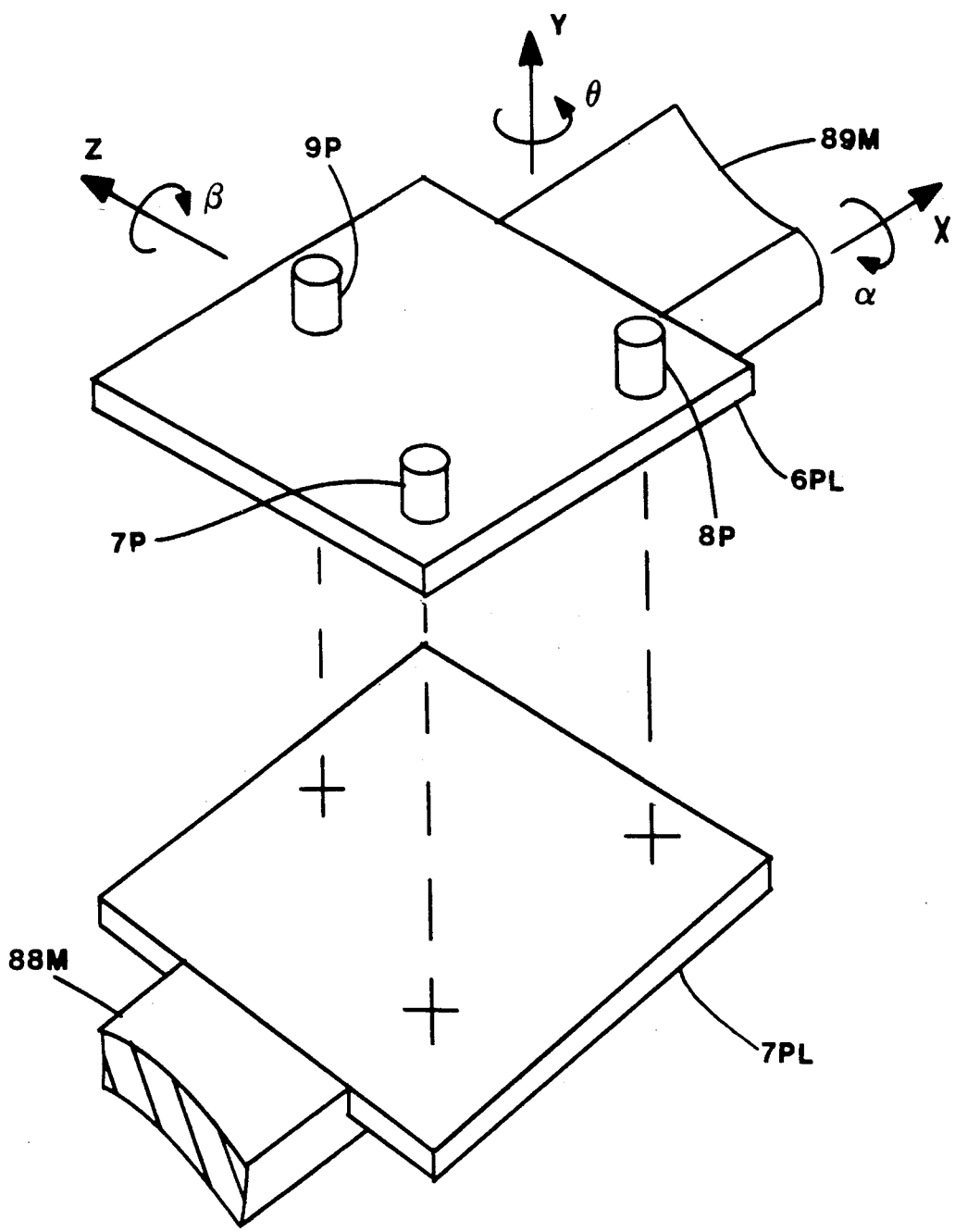
FIG. 5 is a schematic isometric view that shows distance measuring sensors on one plate that measure the distance between an opposing adjacent plate at three points, thus allowing measurement of rotations $\alpha$ and $\beta$ about the X and Z axes and translations along the Y axis of an XYZ coordinate system.

One small translational and two small angular degrees of freedom can be easily determined by looking at the separation between two plates, which are approximately orthogonal to the large axis of motion at a joint. Since the plates are always essentially parallel and the large degree of freedom motion can only cause one plate to rotate with respect to the other, if the separation between the planes is determined at three points, then the relative distance and orientation between the plates will be uniquely defined. This concept is illustrated in FIG. 5 which shows a plate 6PL attached to a measuring beam 89M facing an adjacent plate 7PL mounted to another measuring beam 88M. If the relative distance between the three sensors marked 7P, 8P, and 9P, is known, then combined with the sensor outputs, the Y, $\alpha$, and $\beta$ motions can be accurately determined (the trigonometry involved is elementary).

Since the distance measurements are made across small (0.05" (1.3 mm)) gaps, twelve bit sensor accuracy with the sensors spaced 5" (127 mm) apart will allow for the angles $\alpha$ and $\beta$ to be determined to 2.4 $\mu$rad (0.5 arc-sec) which will result in an endpoint error in a 50" robot of only 0.000120". Also note that electromagnetic non-contact distance measuring sensors (such as impedance probes) measurements will not become distorted by small (1°) $\alpha$ and $\beta$ motions of the plates.

The Y distance measurements between the plates, however, provide no information about the relative XZ position or $\theta$ rotation (i.e. the two remaining small translational and the large rotational degrees of freedom) of the plates (coordinate systems which lie at the ends of the measuring beams). Two systems for detection of these motions are presented here: (1) a "Light source Ring—Lateral Effect Diode Sensor" shown in FIG. 6, and (2) a "Bumpy Ring Sensor" shown in FIG. 7. Both systems are discussed in detail below.

Figure 6:
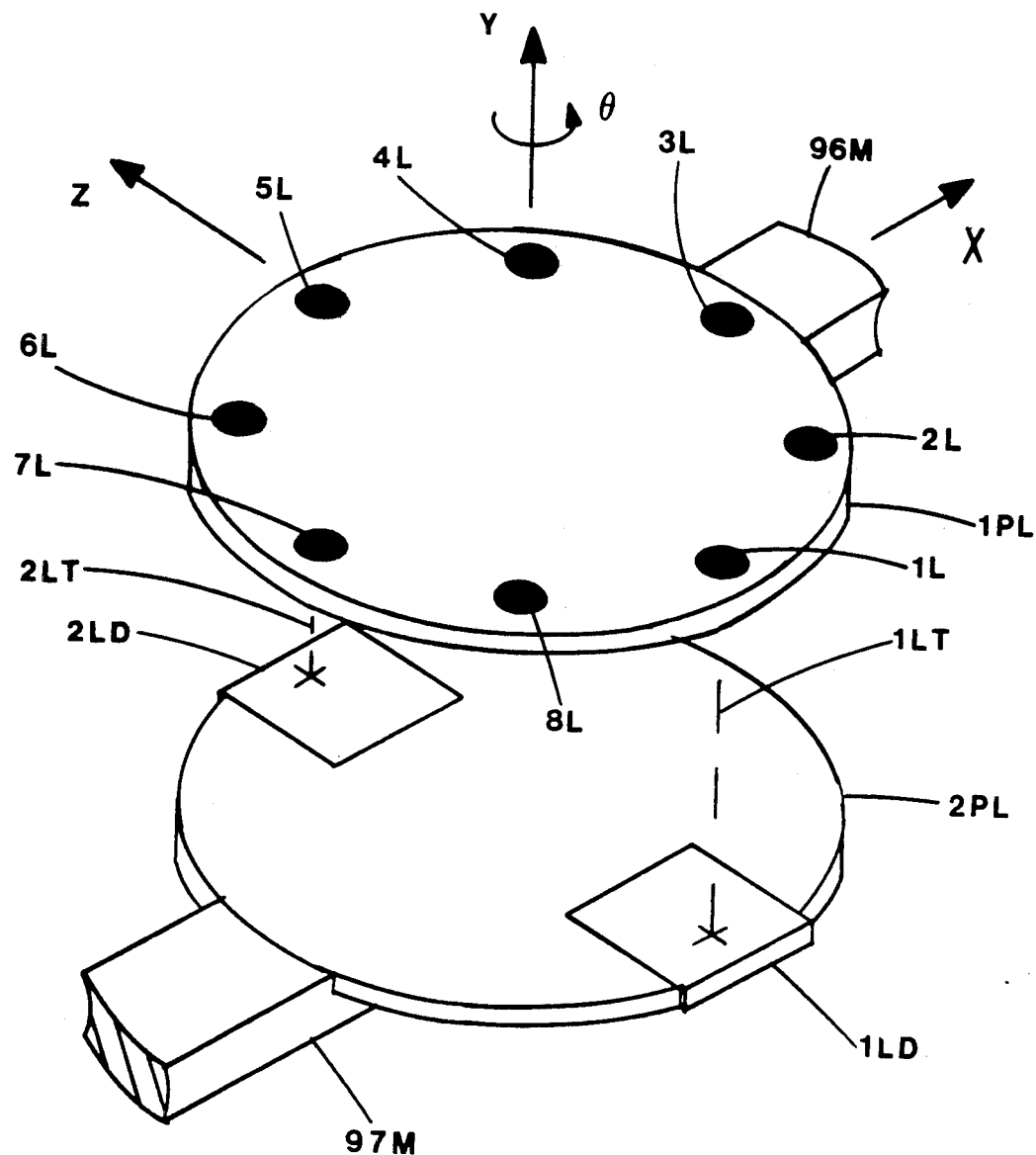
FIG. 6 is a schematic isometric view of a "light source-lateral effect diode sensor" that shows light sources on one plate and photo sensitive diodes on the opposing adjacent plate, the sensors being adapted to measure the rotation $\theta$ about the Y axis and translations in the XZ plane of an XYZ coordinate system.

The lateral effect diode system, shown in FIG. 6, consists of a ring of light sources 1L, 2L, . . . 8L (nL) and two lateral effect diodes 1LD and 2LD (lateral effect diodes output the XZ coordinates of a light spot on its surface) arranged on the two plates 1PL and 2PL (which are mounted on the ends of adjacent measuring beams 96M and 97M), respectively. As shown in FIG. 6, the light souces 1L and 5L direct their beams of light 1LT and 2LT onto diodes 1LD and 2LD, respectively. From initial calibration measurements, the position of each light source and lateral effect diode in its plane is known. When a pulsed light source beam intersects a diode, its XZ coordinates are measured by the diode. Aster the XZ coordinates of two light sources are found, a simple coordinate transform will uniquely define the XZ position and $\theta$ rotation of one plane with respect to the other. The key is to design the measuring beam system so at least one light source is always pointed at a lateral effect diode regardless of the deflected shape of the structural beam. Angular resolution is equal to the ratio of diode resolution to diode spacing, and can be on the order of 25 $\mu$/2.5 (10 $\mu$rad).

To ensure that each lateral effect diode will always have a light source hitting its surface, the spacing between the light sources must be less than the width across the diodes. To operate the senosor, the light sources are sequentially pulsed so two light sources do not simultaneously strike the surface of a diode (or an erroneous signal will result). Pulsing the light sources also allows for identification of which light source hits which diode, and also allows the use of a lockin amplifier to filter noise. To supply the large number of light sources required, fiber optic cables lead from all the joints to a central high quality laser whose light is multiplexed to the cables by a mechanical chopper. Note that a laser is specified because stability of the beam is important.

The problem with the light source-lateral effect diode system is that it is extremely sensitive to dirt (with respect to the micro-inch accuracies that the being sought here). The "Bumpy Ring" sensor described below uses impedance probes in its operation. Impedance probes measure distance by sensing disturbances in their magnetic fields; consequently, they are insensitive to all forms of contamination except for metallic particles.

The Bumpy Ring sensor shown in FIG. 7 uses at least three distance measuring sensors (shown as equally spaced impedance probes 94P, 95P, and 96P) to measure the three degrees of freedom between the plates 1PL and 2PL not measured by the system of FIG. 5. In fact, the sensor arrangement shown in FIG. 5 is incorporated into the bumpy ring sensor, as shown by the placement of sensors 91P, 92P, and 93P (equi-angulary disposed (120 mechanical degrees) and at equal radius from the center of the rings) on the marked plate 8R (shaped like a ring here). These sensors view the target plate marked 8S attached to the end of a measuring beam 98M as they did before. The difference in the system of FIG. 7, is that the other plate 8R is ring shaped and has a series of fine bumps (e.g. bump 7N, the bumps are greatly enlarged here for illustrative purposes only and consist of peaks 7A and valleys 7B with ramps 7C therebetween machined into its inner diameter along a closed loop path. Impedance probes, 94P, 95P, and 96P attached to the plate marked 8C, which is attached to the plate 8S (and indeed is a raised portion 8C extending from the plane of the plate 8S, the cross dimensions of the raised portion 8C being smaller than the cross dimensions of the plate 8S), look radially outward at the bumps. In order to sense the bumps, the sensors 94P–96P are placed out of phase with each other, so that one sensor looks at the peak, one looks at the ramp, and one looks at the trough of a bump. The shape of the signals from the three sensors remains the same as the inner plate 8C undergoes small translations with respect to the ring 8R, only the amplitudes changes. Thus by starting from a home bump 7T, runout is determined by looking at the relative amplitude of the sensor outputs, and rotation is determined by counts of the pumps and looking at the relative phase of the sensor readings. This system is a mechanical analog of a laser interferometer. All the signal processing techniques used by those skilled in the art of laser interferometers are applicable here.

For angular sensitivity, if the slope of the bump is at 45°, angular motion $\epsilon$ at a ring radius $R_r$ will produce a sensor reading $\epsilon R_r$. If fine bumps 7 are used (0.05" (1.3 mm)), an impedance probe with 5 $\mu$in (0.13 $\mu$m) accuracy can be used. Thus a measuring device 5" (12.7 cm) in diameter could sense rotations of 2$\mu$ radians (0.5 arc-seconds). Note that this system will have to be initially calibrated to account for mechanical inaccuracies in the shape and position of the bumps; however, once calibrated, since the bumps will not change, the system will remain accurate.

The combination of sensors to provide accurate determination of one large and five small degrees of freedom is herein referred to as a POSOR (POSition and ORientation) device. Other methods for simultaneously determining one large and five small degrees of freedom will undoubtedly become apparent in the future; however, it is methodology of using the information from a POSOR to determine the position of the measuring beams that is important, not necessarily the method by which it is accomplished.

Thus the methods for measuring six degrees of freedom (five small and one large) using non-contact sensors has been shown. This type of sensor is named by the inventor to be a POSOR (POsition and ORientation measuring device). The next step is to show how to mount this type of sensor on a robot in order to gather useful information. As described above, measuring beams are required to join the POSORs at each end of a link together to ensure that no motion occurs between the individual coordinate systems of the POSORs. As also stated, the measuring beams must not be required to support any load (other than their own weight which can be compensated for with a software correction) so the end point determination problem shown schematically in FIG. 1 will be avoided. The methods of accomplishing these tasks are discussed below.

It will be noted that the main obstacle to accurate position and orientation measurements in robots is caused by the long distance between sources of errors (i.g., successive joints). The slightest external load or friction coefficient acting on a measuring beam will cause a deflection error which is not necessarily repeatable and which can be magnified up to two orders of magnitude at the endpoint. The measuring beam must be supported in a way that allows it complete freedom to connect its two coordinate systems but which does not allow the measuring beam to undergo any significant physical deformation, regardless of the motions of the encasing structural beam.

The measuring beam contributes to the weight of the measuring beam system and is responsible for its primary stiffness. Static deflections of the measuring beam, caused by the accelerated mass of the components supported, are predictable and can be compensated for with a software correction. Alternatively, the cross section of the beam can be chosen such that the slope due to elastic deflections is below a set threshold (e.g., angular resolution of the POSORs).

A measuring beam (with a length to diameter ratio greater than about five) must be supported at two points, roughly at opposite ends of its length, such that it cannot deform (bend) in a direction normal (perpendicular) to its surfaces other than by the influence of an acceleration on its own mass (i.e., it cannot be loaded by external forces or moments), nor must it be allowed to be loaded by external tensile or compressive forces. The supports should be located so an acceleration induced bending moment (in the measuring beam due to its own weight) is minimal. This implies that a measuring beam be supported by the use of a two degree of freedom gimbal at one end, and a four degree of freedom gimbal at the other end. For measuring beams with a length to diameter ratio less than about five, one rigid support can be used to hold the measuring beam to the structural beam. In this configuration, it is possible to support the measuring beam without the structural beam imposing any loads upon it.

Deflections of a structural beam impose certain restrictions on the gimbal support design. Since the structural beam can deflect sideways in two directions, each end of the measuring beam must be pinned about two orthogonal axes. In addition, since the structural beam can twist about its lengths, one end of the measuring beam must be pinned about an axis parallel to its length. Furthermore, since the length of the structural beam can change, the measuring beam must be held in such a way that one end is free to move along its longitudinal axis. These possible motions form the basic design requirements for the support gimbals.

The gimbals are critical elements in the measuring beam system because deflections of the measuring beam caused by gimbal reaction torques are not predictable (breakaway torques are not repeatable). Consequently, it is important to design the system so the effects of the latter are below a desired threshold. The magnitudes of the degrees of freedom that the gimbals must provide are small, so it will be easy to establish and maintain a suitable reaction torque threshold. Note that since the POSORs measure all motions of the measuring beam, the gimbals do not necessary have to be accurate, but they must have a low reaction torque.

The term gimbal as used herein does not necessarily imply the use of ball bearings because the required degrees of freedom are all small. Possible support schemes include magnetic levitation, air bearings, ball bearings, wire supports (e.g., wires or cables, the terms being interchangeable in this specification; the term wire herein means a flexible connecting member that can only transmit tensile forces and includes cables and chains), or combinations thereof. In all cases, the lower the reaction torque and the higher the ratio of the beam moment of inertia to sensor system mass, the lower the induced error in the measuring beam system. In most cases, simplicity and reliability will be the chief design criteria, and direct mechanical support (wires) will be chosen. Note that the POSORs can sense bearing runout, so low friction and breakaway torque are more important than bearing accuracy. The methods of optimizing gimbal designs are well known to those skilled in the art of gyroscopes.

Figure 3:
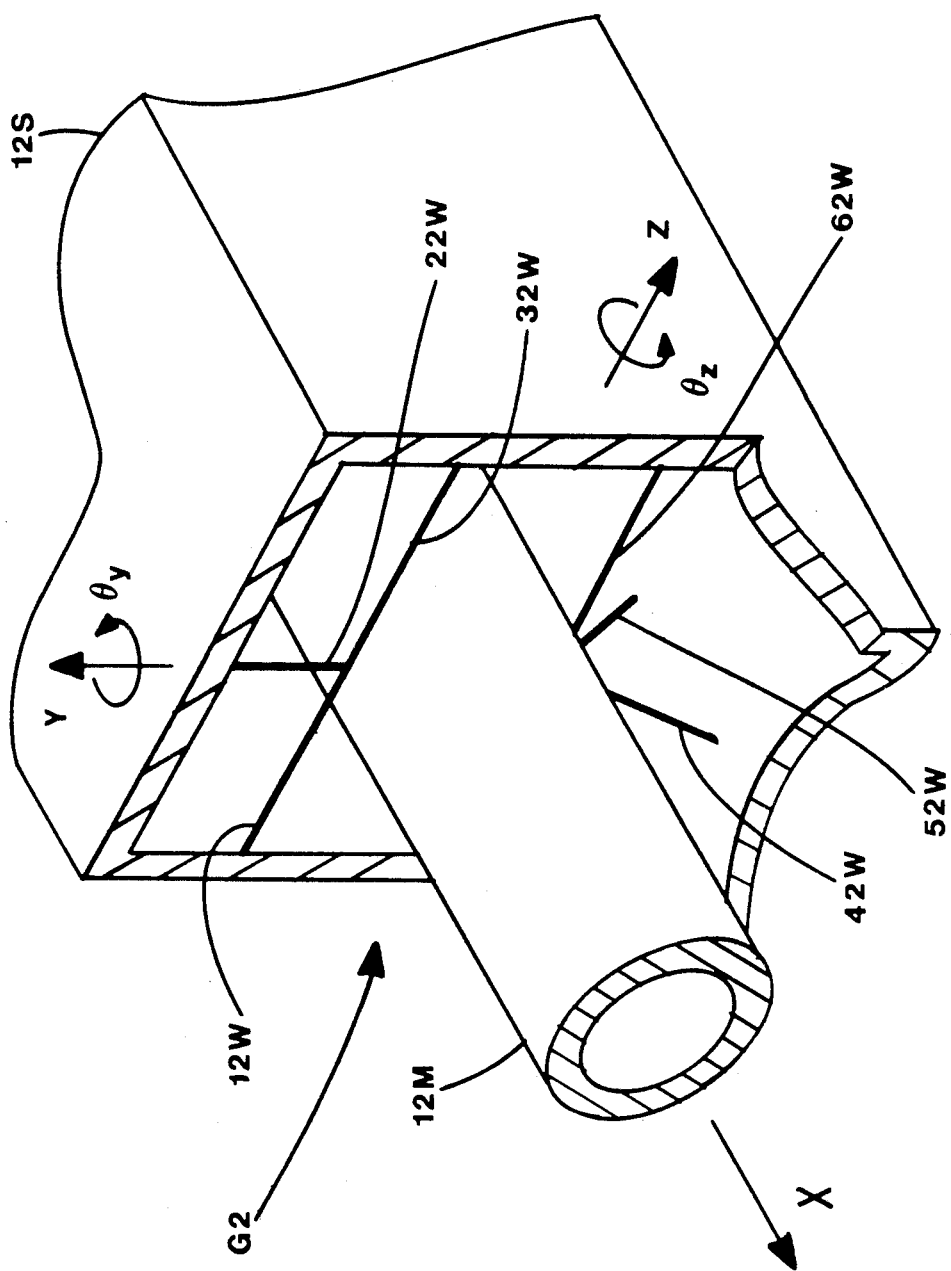
FIG. 3 is a cutaway isometric schematic section view that shows one end of a measuring beam anchored to a structural beam by a two degree of freedom wire support gimbal.
Figure 4:
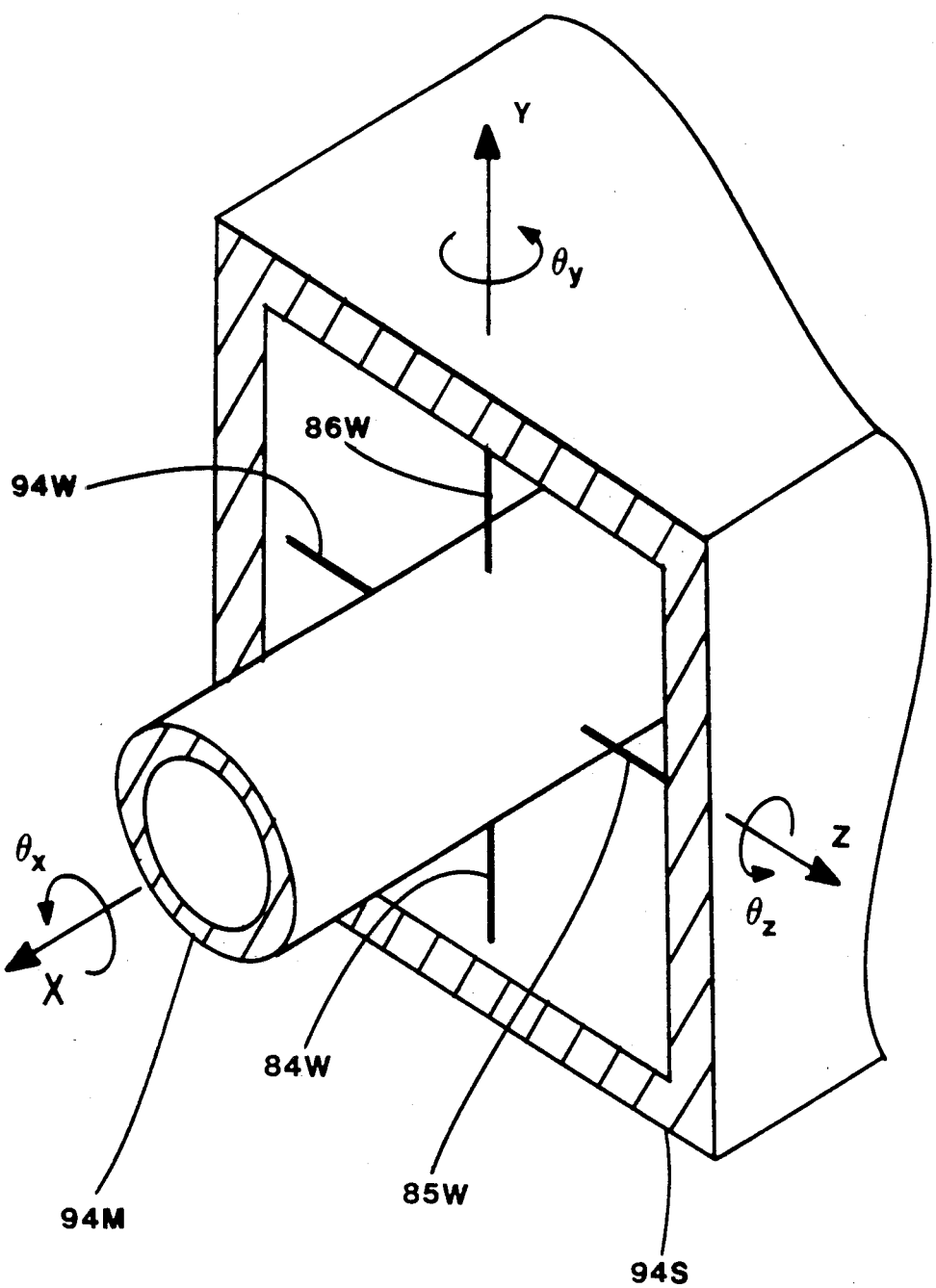
FIG. 4 is a cutaway isometric schematic section view that shows the other end of the measuring beam of FIG. 3 anchored to the structural beam by a four degree of freedom wire support gimbal.

Wire support gimbals are shown schematically in FIGS. 3 and 4 for the purpose of illustrating the types of gimbals to be used in the discussion of a specific robot design in a following section of this document. Wire support gimbals are very simple structures which would require the least amount of maintenance, and require the least amount of space. This would allow the measuring beam size to approach the structural beam size, which would increase static and dynamic performance. The two and four degree of freedom wire support gimbals are similar except that the diagonal wires shown in FIG. 3 provide stiffness along and about the X axis.

With reference to FIG. 3, the workings of the two degree of freedom wire support gimbal are now explained. A measuring beam 12M is located inside a structural beam 12S. A wire 22W resists motion of the measuring beam in the −Y direction only. Wires 42W and 52W resist motion of the measuring beam in the +Y direction and, because of their diagonal configuration, also resist translation of the measuring beam in the X directions. Wires 12W, 32W, 62W and 72W (wire 72W cannot be seen in this view, but is the complement of 62W as is 12W the complement of 32W) resist motion of the measuring beam in the Z direction. Also, because they are arranged on top and bottom of the measuring beam, the wires will prevent the measuring beam from twisting about the X axis. Thus, the combination of all wires allows small motions $\theta_Y$ and $\theta_Z$ about the Y axis and about the Z axis, but restrain all other degrees of freedom.

With reference to FIG. 4, the workings of the four degree of freedom gimbal are now explained. Wires 84W and 86W resist motions in the Y directions of a measuring beam 94M with respect to its encasing structural beam 94S. Wires 94W and 85W resist motions in the Z directions of the measuring beam 94M with respect to the structural beam 94S. Thus, the combination of all wires restrains motion only in the Y and Z directions while allowing small motions along and about all other axes. The method of sizing of the wires would be known to one skilled in the art of strength of materials.

The remainder of the discussion will describe the implementation of the measuring beam system and principle into a conceptual design of a five degree of freedom robot.

FIG. 2 shows how a structural system and measuring system can be combined in a high accuracy five axis robot (for most high accuracy operations such as drilling, deburring, and cutting, a sixth axis is not needed). For these designs, a Bumpy Ring POSOR is used, and support wires are also used for gimbals. The basic construction of the structure system consists of offset box beams joined by turntable (four point contact) bearings with integral gear teeth. This allows the drive motors (electric, pneumatic, or hydraulic) to drive the joints from the outside which prevents interference with the POSORs.

With reference to FIGS. 2 and 11, the structural system of the five degree of freedom robot is described first. The joins labeled J1, J2, J3, J4, and J5 of the five axis robot include the unions of the structural beams 1S and 2S, 2S and 3S, 3S and 4S, 4S and 5S, and 5S and 6S, respectively. Joints J1, J2, J3, J4, and J5 allow large relative angular motions between their associated structural beams about the Z, Y, Y, X, and Z axes, respectively, for the robot in the position shown. The joints and structural beams are configured such that the interior space of the robot allows a clear open path for the measuring beam system to be located in. The large angular motion at each of the joints is controlled by actuators 1A, 2A, 3A, 4A, and 5A (FIG. 11). At joints J1, J2, and J3, the structural beams are joined by turntable bearings 1B, 2B, and 3B with integral external (i.e. peripheral) gear teeth. Pinions 1AP, 2AP, and 3AP drive the gears thereby causing angular motion at the joints, respectively. At the joint J4 an internal tooth turntable bearing 4B is used and a driveshaft 4AD provides power from the actuator 4A to a pinion 4AP to cause rotation at the joint. Actuator 5A actually consists of two fluid pistons (or one double acting piston) which pull a chain 5AC over a sprocket which is attached to structural beam 6S, thereby causing angular motion of structural beam 6S with respect to structural beam 5S about bearings 5B and 5B2.

The measuring beam system is shown installed inside the structural system in FIG. 2, and alone in FIG. 12. In these large isometric views, the distance measuring devices and the bumps on the Bumpy Ring POSORs are not shown because they are too small to accurately picture them on the drawing. Within the hollow structural joints J1, J2, J3, J4, and J5 are POSORs 1P, 2P, 3P, 4P, and 5P which measure the relative position and orientation between the ends of measuring beams 1M and 2M, 2M and 3M, 3M and 4M, 4M and 5M, and 5M and 6M, respectively. FIGS. 8, 9, and 10 show enlarged views of the major subassemblies of the robot: the base, elbow, and wrist. FIGS. 13, 14, and 15 show enlarged views of each of the major sub-assemblies of the measuring beam system: the base, elbow, and wrist, and in each of these figures the distance measuring sensors are shown (the bumps are not shown because they would be too small to draw even on this enlarged scale).

Each structural beam 1S, 2S, 3S, 4S, 5S, and 6S shown in FIG. 2 has a measuring beam 1M, 2M, 3M, 4M, 5M, and 6M attached (directly or indirectly depending on the length to diameter ratio of the beams), respectively. Within the hollow structural joints J1, J2, J3, J4, and J5 are POSORs 1P, 2P, 3P, 4P, and 5P, respectively, which measure the relative position and orientation been the ends of measuring beams 1M and 2M, 2M and 3M, 3M and 4M, 4M and 5M, and 5M and 6M respectively. The structural beam 1S is attached to some stationary reference surface and the measuring beam 1M is also attached to this surface. For length to diameter ratios of less than about 5, the measuring beam can be cantilevered in this way without the need for second support gimbal. Similarly, the measuring beams 2M and 5M are attached to structural beams 2S and 5S by posts 2G and 5G respectively. Likewise, the measuring beam 6M is attached to the surface of an end effector (not shown for clarity) which would be attached to the end of structural beam 6S. The measuring beams 3M and 4M, on the other hand, are very long, and are held to their structural beams 3S and 4S by two and four degree of freedom gimbals 3G2, 3G4 and 4G2, 4G4, respectively. The detail of the measuring beam system sub-assemblies for the base, elbow, and wrist portions of the robot, as shown in FIGS. 13, 14, and 15, are now discussed in greater detail.

FIGS. 8 and 13 shows the detail of the measuring beam system assembly's base section installed in the robot and by itself, respectively. As shown in FIG. 13, the measuring beam 1M is anchored to a fixed reference surface, and the other end supports the plate 1TP. Measuring beam 2M supports a bumpy ring 1BR which fits over measuring beam 1M. Distance measuring probes 11IP, 21IP, and 31IP are anchored to the inside of measuring beam 1M and they measure the bumps (too small to be drawn in this view) that are on the inner surface of a ring 1BR thereby allowing the determination of the large degree of freedom (rotation about the Z axis of the joint J1) and two small translational degrees of freedom (Y and X axis of the joint J1). These sensors perform the same function as sensors 94P, 95P, and 96P that were discussed earlier in FIG. 7. Similarly, the Bumpy ring 1BR performs the same function of the ring 8R of FIG. 7, and the end of the measuring beam 1M acts as the raised portion 8C of FIG. 7. Distance measuring sensors 41IP, 51IP, and 61IP (like the sensors 91P-93 (in FIG. 7) are anchored in the bumpy ring and they measure the distance between the bumpy ring 1BR and the plate 1TP thereby allowing three small degrees of freedom (two small angular degrees of freedom about the Y and X axes and small motions along the Z axis of joint J1) between measuring beams 1M and 2M to be determined. Similarly, sensors 41IP, 51IP, and 61IP perform the same function as sensors 91P, 92P, and 93P of FIG. 7 respectively, and the ridge 1TP the same function as the ridge 8S in FIG. 7.

A similar arrangement of sensors and mechanical components is used for the second POSOR 2P shown in FIGS. 8 and 13, although the degrees of freedom are about a different set of axes. In this view, only the distance measuring sensor marked 12IP can be seen. In the same manner as POSOR 1P was described, POSOR 2 has a plate 2TP which is attached to the measuring beams 2M, and a bumpy ring 2BR, which is attached to the measuring beam 3M, fits over the end of the measuring beam 2M and is essentially parallel to the plate 2TP.

The elbow joint measuring beam sub-assembly J3 is shown in detail inside the structural assembly in FIGS. 9 and 14 and contains the POSOR 3P. Its operation is identical to that of the POSOR 1P (described above) except the axes of motion in the global XYZ coordinate reference system are different (it is tilted ninety degrees). As drawn in FIG. 14, distance measuring probes 13IP, 23IP, 43IP, and 63IP are visible. Note how the measuring beam 4M has a small bend 220 at its end in order to traverse the dimension of the joint and hold the plate 3TP near the bumpy ring 3BR.

FIGS. 10 and 15 show the wrist sub-assembly J5 of the measuring beam system. It contains two POSORs 4P and 5P. These POSORs operate on the same principle as the others in the structure, but they have the bumpy rings machined onto the ends of the measuring beams 4M and 6M which the rings 4BR and 5BR, respectively, fit over. This configuration is used to prevent a high power laser, which may use the measuring beams as beam guides, from hitting the distance measuring sensors. In this figure, only some of the distance measuring sensors can be seen. On the POSOR 4P, sensors 44IP and 14IP are shown and, on the POSOR 5P, sensors 15IP, 25IP, 35IP, 45IP, and 55IP are shown.

FIG. 16 shows a schematic representation of a measuring beam system with n POSORs. A coordinate transformation matrix $T_{n,\,n-1}$ must be generated from the sensor output at each joint in order to determine the position of a measuring beam n in terms of the coordinate system of measuring beam $n-1$. In this manner, a series of the transformations will yield the coordinates of the robot endpoint in terms of the fixed global coordinate system. These methods of coordinate transformation have been known to those skilled in the art; however, until this invention small motion terms ($\alpha_n$, $\beta_n$, $\delta X_n$, $\delta Y_n$, $\delta Z_n$) had to be neglected because there was no method of measuring the needed quantities.

FIG. 17 shows (in schematic form) the analog output from the six sensors (sensors 1-sensor 6) from a POSOR being converted by analog to digital converters (known as ADCs) ADC1-ADC6, respectively which are controlled by a microprocessor 101. Due to the speed at which the signals must be gathered for use by the main microprocessor (shown 102 in FIG. 18) a single microprocessor is assigned to gather the data for each joint and compute the components of the coordinate transformation matrix $[T_{n,n-1}]$ for that joint.

FIG. 18 shows n such microprocessors (microprocessors 1-microprocessors N) operating on input from the n joints connected to a common data bus which is controlled by the main microprocessor 102. This microprocessor multiplies the coordinate transformations and signals the joint microprocessors when they should make their information available. The output from the main microprocessor can take a variety of forms depending on which type of standard robot controlled is to be used, or if a custom design is to be used. The computer architecture is known to one skilled in the art of computer hardware, particularly those familiar with machine tool and robot servocontrollers.

The system shown at 110 in FIG. 19 includes, in block diagram form, many of the circuit and other elements discussed in detail above. In one form, the system 110 is an industrial robot under the control of a computer 122. This computer contains the main microprocessor and servocontroller shown in FIG. 18, as well as capabilities for optimum path planning and other manufacturing planning aids. The prime movers to provide the large degree of freedom rotational movement of the structural beams at the joints are shown as drive motors 123 (e.g., servomotors) powred and controlled by signals from the computer 122 which are amplified by a power source 124. The lines labeled 115, 116, 118 and 119 carry electrical signals; the lines 117 and 120 represent mechanical linkages; and the line 121 represents electromagnetic waves from sensing devices 127 that measure position and orientation between the ends of the measuring beams. The sensing devices 127 measure the single large degree of rotational movement at a joint and the five small degrees of movement before discussed. In certain cases, less than the five small degrees of freedom may be sensed, according to the needs of the user. The signals 116 from the sensing devices are processed by the signal processing circuitry 128, which includes one set of components shown in FIG. 17 for each large degree of freedom motion the robot can make.

Since the measuring beams always track the structural beams, and the measuring beams remain straight, they can be used as a structure on which to mount mirrors which can direct a high power laser beam up through the robot to the endpoint where it can be employed to do useful work. This is shown schematically in FIG. 19, where a laser power source 130 sends a beam through mirror assemblies 131 which are supported by the measuring beams 125. The laser beam is reflected off the mirrors 131 that are guided by the measuring beams 125 until the beam exits the robot and does useful work on an object 132.

Because the measuring beams never bend and they track the motions of the structural beams, they serve as ideal beam guides for a high power laser. In fact, all that needs to be done is properly to position a mirror at each joint to direct the laser light up through the measuring beam structure. Combined with the ability of a measuring beam system to allow a robot to be remotely programmable, a new type of machine tool will be created. This new machine tool will be low weight, long reach, and dexterous and will be able to precisely process materials using lasers or water jets as the material removal system instead of mechanical cutters. It will be comparable in cost to existing machines, but it will be far more accurate, and it will never "wear out" because all the critical accuracy will be in non-contact sensors. The light beam is directed through the interior of each hollow structural beam and at the terminal measuring beam, is employed to do useful work.

FIG. 20 illustrates this concept in detail. A five axis robot 166 has structural hollow beams 75, 76, 77, 153, and 78. Structural beam 75 is anchored to a reference surface via joint 154. Joint 79 connects structural beams 75 and 76. Joint 80 connects structural beams 76 and 77. Joint 84 connects structural beams 77 and 78. Inside these structural beams is a series of associated hollow measuring beams. Since the first two axes of the robot, those about joints 154 and 79, are so close, the first measuring beam is actually a coupling of POSORs 89 and 85. Measuring beam 90 tracks the motions of structural beam 76. Measuring beam 93 tracks the motions of structural beam 77. Measuring beam 94 tracks the motions of structural beam 153, and measuring beam 95 tracks the motions of structural beam 78. The gimbals used to support the measuring beams with respect to their associated beams are not shown in this two dimensional drawing for clarity. They are, however, equivalent to the gimbals used to support the measuring beams shown in FIG. 2. The distinguishing feature of the robot shown in FIG. 20 over the robot shown in FIG. 2 is the addition of the laser power source 63 and the mirror assemblies 65, 66, 67, 68, 69, and 70. These mirrors guide a laser beam 64 along the measuring beams to a focusing mirror 73 at the end of the terminal measuring beam 78. The focusing lens focuses the beam to a fine point and it exits the robot and does useful work on an object 74. Even though the structural beams will bend due to their cantilevered construction, the measuring beams will remain straight and act as beam guides within the robot to direct the laser beam. By placing the beam guides inside the robot increased dexterity of the robot is gained. Furthermore, the measuring beams, which also serve as the beam guides, give accurate position feedback information which is used to determine where in space the robot is.

All surfaces which sensors measure the distance from should be made from aluminum to prevent a varying magnetic grain structure from causing error in the sensor readings. Inductance sensing probes are the preferred type of sensor because they are sensitive only to contamination by metallic particles, whereas capacitance probes are sensitive to any material which changes the dielectric constant across the gap to be measured.

Further modifications will occur to persons skilled in the art and all such modifications are within the scope of the invention as defined by the appended claims.

What is claimed is:

1. A system to move an object in space, that comprises: an articulated structural mechanism for applying forces and moments to position an object held by the structural mechanism, said structural mechanism comprising a plurality of structural beams, a measuring beam associated with each structural beam, each measuring beam being in contact only with the associated structural beam, each said structural beam further including support device means that provides the only physical contact between the structural beams and the associated measuring beam such that the structural beam applies no significant loads on the associated measuring beam; and measuring means, which includes said measuring beam, operable to determine the actual position and orientation of said each structural beam with respect to a spatial reference.

2. A system according to claim 1 wherein the structural mechanism comprises two structural beams connected together in an articulated arrangement with adjacent ends of adjacent associated measuring beams slightly spaced apart from one another but in close proximity to one another and in which the measuring means includes sensors that note the spatial relationship or orientation of one measuring beam with respect to the adjacent measuring beam.

3. A system according to claim 1 wherein the associated measuring beam is supported at each end thereof by a support device that supplies the only connecting between the measuring beam and its associated structural beam.

4. A system according to claim 1 wherein said measuring beam is in contact only with the support device means, of the associated structural beam said support device means being located to position the measuring beam always essentially parallel to the associated structural beam.

5. A system according to claim 4 in which the support device means holds the measuring beam essentially parallel to the associated structural beam in a manner which causes the measuring beam to be subject to loads due only to its own weight.

6. A system according to claim 5 in which the support device means comprises a pair of support devices to support the measuring beam with reference to its associated structural beam, with the measuring beam length-to-diameter ratio greater than about five, said pair of support devices being respectively a two-degree-of-freedom anchoring device that support one end of the measuring beam and a four-degree-of-freedom anchoring device that supports the other end of the measuring beam.

7. A system according to claim 6 in which said two-degree-of-freedom anchoring device holds one end of said measuring beam to one end of said structural beam such that the two degrees of freedom are provided for the measuring beam to move with respect to the structural beam and provide said two degrees of freedom in a way that allows small rotations about two orthogonal axes.

8. A system according to claim 7 in which said small rotations are no greater than the order of five angular degrees.

9. A system according to claim 6 wherein the four-degree-of-freedom anchoring device for holding the other end of said measuring beam to the other end of said structural beam permits four degrees of freedom whereby the measuring beam is allowed to move with respect to the structural beam in small rotations about three orthogonal axes and in small linear motion along one axis.

10. A system according to claim 9 wherein the small rotations are no greater than about five angular degrees and the small linear motion is no greater than about one centimeter.

11. A system according to claim 6 wherein the two-degree-of-freedom anchoring device is a two-degree-of-freedom gimbal and wherein the four-degree-of-freedom anchoring device is a four-degree-of-freedom gimbal.

12. A system according to claim 11 wherein each gimbal is a gimbal mechanism that uses wires to support the measuring beam, said wires being arranged to provide two small degrees of freedom at one end and four small degrees of freedom at the other end of said measuring beam.

13. A system according to claim 6 that comprises a plurality of measuring beams, each with an associated structural beam that supplies support, through said anchoring devices to its associated measuring beam, forming an articulated structure, wherein said measuring means is adapted to measure six degrees of freedom between each set of adjacent ends of the measuring beams without transferring any loads from one measuring beam to the other.

14. A system according to claim 13 wherein the measuring means measures one large degree of freedom and five small degrees of freedom, which measuring means comprises sets of juxtaposed plates that serve as plate-pairs, one plate being mounted on each free end of each measuring beam, said plates having sensors that determine the position and orientation of one adjacent plate with respect to the other, juxtaposed, plate.

15. A system according to claim 14 wherein the two plates in a plate-pair are disposed essentially parallel to each other.

16. A system according to claim 14 wherein said measuring means includes distance-measuring devices and position-measuring devices to determine the position and orientation of said plates with respect to each other.

17. A system according to claim 14 wherein the measuring means includes position measuring means comprising an array of at least two light sources attached to one of said plates and at least one position-measuring device mounted to the other plate, said line sources and said position-measuring device being used in determining the translational position and rotational orientation of one said plate with respect to the other said plate.

18. A system according to claim 17 wherein the two light sources are lasers or other light sources which remain sufficiently collimated over the distance between said plates.

19. A system according to claim 17 in which the position-measuring device contains a photo-sensitive diode device.

20. A system according to claim 17 in which the position-measuring device contains an array of photo-sensitive diodes.

21. The system of claim 17 in which the position measuring means comprises a plurality of position measuring devices, in which each position-measuring device is photo sensitive and in which the measuring means is configured such that at least one line source is always able to project onto the sensor surface of each said position-measuring device.

22. The system of claim 21 wherein the position-measuring means comprises a configuration to determine translation and rotation of said juxtaposed plates in a plate-pair with respect to one another.

23. The system of claim 17 wherein the position-measuring means comprises a single photo-sensitive device and in which the measuring means is configured to provide radiation from two said light sources which always projects onto the photo-sensitive region of said single photo-sensitive position-measuring device.

24. The system of claim 23 wherein the position-measuring means comprises a configuration to determine translation and rotation of said juxtaposed plates in a plate-pair with respect to one another.

25. A system according to claim 17 wherein the measuring means uses three distance-measuring devices to measure the separation of the juxtaposed plates in a plate-pair and their angular orientation (nonparallelism), which information is combined with information from the photo-sensitive position-measuring means to uniquely determine the relative position and orientation of said juxtaposed plates in a plate-pair and, hence, of said adjacent measuring beam.

26. A system according to claim 13 wherein the terminal endpoint of the ultimate structural beam holds an end effector plate used for attaching end effectors (grippers, etc.), and an ultimate measuring beam, with a length-to-diameter ratio less than about five, anchored rigidly to the end effector plate, the other end of the ultimate measuring beam being free floating or unrestrained.

27. The system of claim 26 wherein the position and orientation of the ultimate measuring beam with respect to the penultimate measuring beam is determined by measuring the relative position and orientation of two plates, one plate being attached to the respective ends of each of the ultimate and penultimate measuring beam.

28. A sensor to measure one large rotational degree of freedom, two small rotational degrees of freedom and three small translational degrees of freedom, comprising:
a substantially flat plate with a circular raised portion extending out of the plane of the plate, the cross dimensions of the raised portion being smaller than the cross dimensions of the plate;
a ring with bumps formed in it at the inner surface thereof, the ring being placed adjacent to but spaced from the plate such that the bumps face the raised portion of in a nested configuration wherein the raised portion is the outer beam and is free to revolve about an axis that is common to the ring and the circular raised portion said ring having a planar surface juxtaposed with respect to the flat plate and facing the flat plate;
at least three first non-contacting distance measuring devices which measure the distance between the flat plate and said planar surface; and
at least three further non-contacting distance measuring devices which measure the distance between said raised inner surface of the flat plate and said bumps on the ring such that one sensor is alway reading distance between said raised surface and the steepest sloping part of a bump.

29. A sensor to measure angular rotation and position of two beams configured to permit relative rotation between the beams that comprises:
a first beam of the two beams, having a series of fine bumps disposed in a circular configuration and at least three non-contacting measuring devices disposed in a circular nested fashion with respect to the circularly-disposed series of fine bumps, the measuring devices being spatially out of phase with one another with respect to the bumps so that one sensor of the three sensor senses the peak of a bump, another sensor senses the ramp of a bump, and the other sensor senses the trough between bumps, the combined sensor serving to provide angular and position (runout of the angular motion axis) information with respect to the two beams.

30. The measuring beam system of claim 1 wherein said measuring beams are made from hollow tubular beams which employ mirrors in the regions where the measuring beams meet to enable a light beam to be beamed through the center of each measuring beam, said light beam being directed to the end of the terminal measuring beam system where it does useful work.

31. A system that comprises:
a plurality of links in an articulated arrangement, each link comprising a structural beam, a measuring beam and connecting means to attach the measuring beam to the structural beam to provide three degrees of freedom between the measuring beam and the structural beam such that deflections of the structural beam do not impose any significant load on the measuring beam, said connecting means providing the only connection between the structural beam and the measuring beam.

32. A system according to claim 31 in which the structural beam is a hollow elongated member, in which the measuring beam is disposed within the structural beam and along the axis of the structural beam, and in which the measuring beam is connected only at each end thereof to the respective end of the structural beam.

33. A system according to claim 31 in which said deflections are small motions of said structural beam resulting from loads on said structural beam, said motions include small angles of twist about the axis of the structural beam and small bending movements about the transverse axes of the structural beam.

34. A system according to claim 33 in which said small motions induce less than about 5% strain on the structural members.

35. A system according to claim 31 in which each link of the plurality of links is like said link, a first link being rotatably connected at one end thereof to an anchor and being rotatably connected by a joint at the other end thereof to a second link of the linkage, said system including measuring means and said measuring beam operable to establish spatial relationship of the measuring beam of the first link with respect to the anchor at said one end thereof and said other end thereof with respect to the measuring beam of said seond link.

36. A system according to claim 35 in which adjacent ends of the measuring beams at said joint are slightly spaced apart but in close proximity to one another and in which the measuring means include sensors that note spatial relationship of one measuring beam with respect to the adjacent measuring beam.

37. A system according to claim 31 comprising several links and several joints with sensors at each joint to note said spatial relationship at each joint.

38. A system according to claim 37 having an end effector at the end point of the structural beam of the last link and a drive motor at each joint connected to effect angular motion of the structural beams at said each joint with respect to one another.

39. A system according to claim 37 in which the measuring means is adapted to measure said spatial relations to an accuracy of about one part in 50000.

40. A system according to claim 31 in which said connecting means comprises wires connecting one end of the structural beam to one end of the measuring beam and further wires connecting the other end of the structural beam to the other end of the measuring beam.

41. A system according to claim 40 wherein the connecting means provides six small degrees of freedom between the structural beam and the measuring beam.

* * * * *